US012251851B2

(12) United States Patent
Yang et al.

(10) Patent No.: US 12,251,851 B2
(45) Date of Patent: Mar. 18, 2025

(54) STRIKING MEMBER INSTALLATION MECHANISM AND NAIL GUN HAVING SAME

(71) Applicant: TAIZHOU DAJIANG IND. CO. LTD., Zhejiang Province (CN)

(72) Inventors: Tao Yang, Zhejiang Province (CN); Mingjun Yang, Zhejiang Province (CN); Qinling Ying, Zhejiang Province (CN); Haijun Li, Zhejiang Province (CN); Bingzhen Jiang, Zhejiang Province (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/238,014

(22) Filed: Aug. 25, 2023

(65) Prior Publication Data

US 2024/0066747 A1 Feb. 29, 2024

(30) Foreign Application Priority Data

| | | |
|---|---|---|
| Aug. 26, 2022 | (CN) | 202211034065.9 |
| Aug. 26, 2022 | (CN) | 202211035544.6 |
| Aug. 26, 2022 | (CN) | 202211035554.2 |
| Aug. 26, 2022 | (CN) | 202222261203.9 |
| Aug. 26, 2022 | (CN) | 202222261206.2 |
| Aug. 26, 2022 | (CN) | 202222263098.2 |

(51) Int. Cl.
*B27F 7/11* (2006.01)

(52) U.S. Cl.
CPC .......... *B27F 7/11* (2013.01)

(58) Field of Classification Search
None
See application file for complete search history.

(56) References Cited

U.S. PATENT DOCUMENTS

| | | | | |
|---|---|---|---|---|
| 2,585,939 A * | 2/1952 | Juilfs | B27F 7/34 | 227/130 |
| 2,928,094 A * | 3/1960 | Crooks | B27F 7/34 | 227/86 |
| 2,938,212 A * | 5/1960 | Hershey | B27F 7/38 | 227/86 |
| 7,784,661 B2 * | 8/2010 | Yagi | B27F 7/21 | 227/129 |
| 2021/0060749 A1 * | 3/2021 | Yang | B25C 1/008 | |
| 2021/0394346 A1 * | 12/2021 | Okouchi | B25C 1/06 | |

FOREIGN PATENT DOCUMENTS

CN 204019481 U * 12/2014

* cited by examiner

*Primary Examiner* — Tanzim Imam
(74) *Attorney, Agent, or Firm* — Locke Lord LLP; Tim Tingkang Xia, Esq.

(57) ABSTRACT

A nail gun having a striking member installation mechanism comprises a casing having a main casing body, and a striking member baffle removably disposed over a replacement opening of the main casing body; a striking member removably disposed inside the main casing body and below the striking member baffle; and a striking member driving assembly having a piston for driving the striking member in a reciprocating motion direction, wherein the striking member has a striking member tail, a protruding part, and a guiding striking part; wherein the piston comprises a striking member connector having a protruding part receiving hole; and wherein the protruding part is removably received in the protruding part receiving hole.

7 Claims, 23 Drawing Sheets

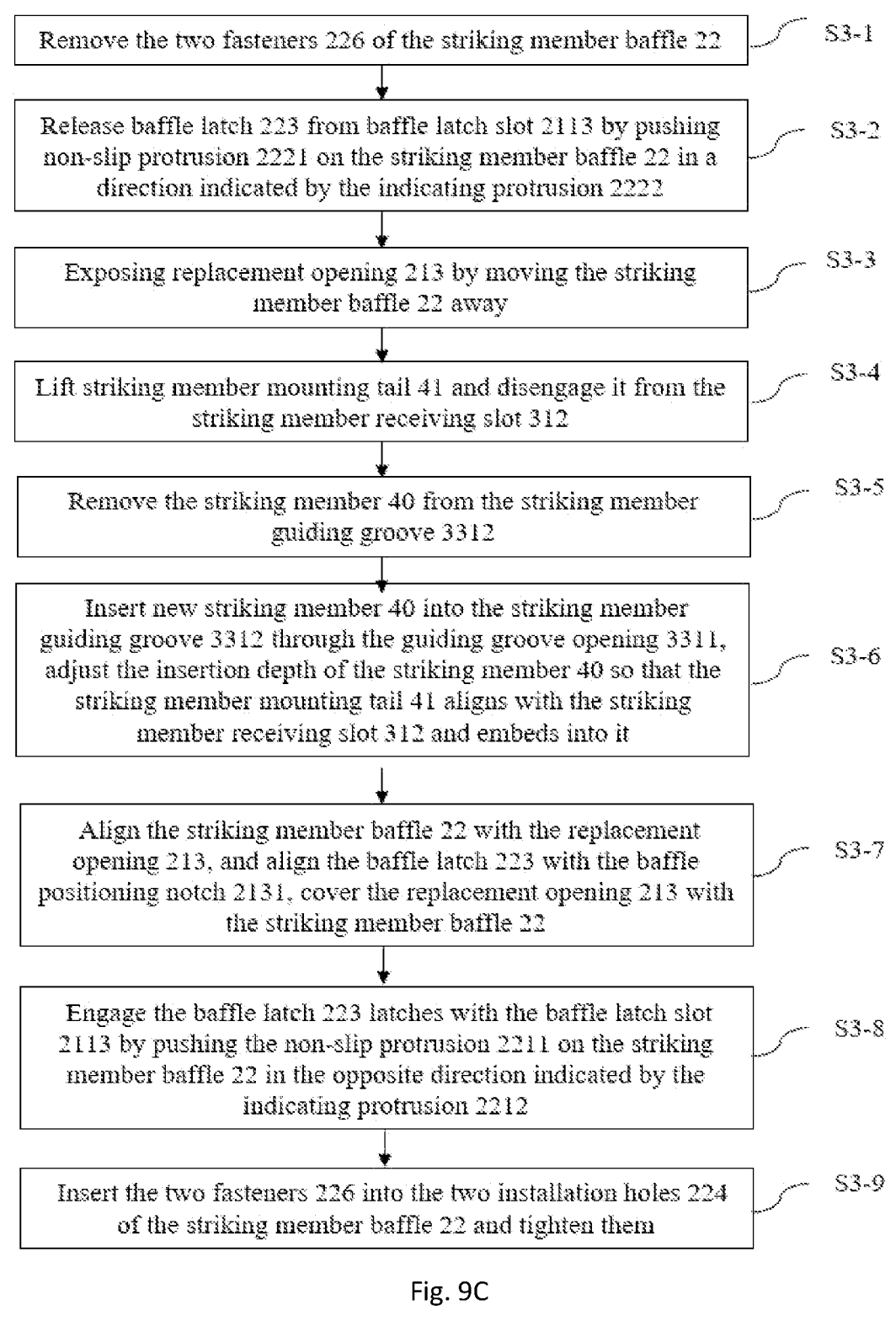

S3-1: Remove the two fasteners 226 of the striking member baffle 22

S3-2: Release baffle latch 223 from baffle latch slot 2113 by pushing non-slip protrusion 2221 on the striking member baffle 22 in a direction indicated by the indicating protrusion 2222

S3-3: Exposing replacement opening 213 by moving the striking member baffle 22 away S3-4: Lift striking member mounting tail 41 and disengage it from the striking member receiving slot 312

S3-5: Remove the striking member 40 from the striking member guiding groove 3312

S3-6: Insert new striking member 40 into the striking member guiding groove 3312 through the guiding groove opening 3311, adjust the insertion depth of the striking member 40 so that the striking member mounting tail 41 aligns with the striking member receiving slot 312 and embeds into it S3-7: Align the striking member baffle 22 with the replacement opening 213, and align the baffle latch 223 with the baffle positioning notch 2131, cover the replacement opening 213 with the striking member baffle 22

S3-8: Engage the baffle latch 223 latches with the baffle latch slot 2113 by pushing the non-slip protrusion 2211 on the striking member baffle 22 in the opposite direction indicated by the indicating protrusion 2212

S3-9: Insert the two fasteners 226 into the two installation holes 224 of the striking member baffle 22 and tighten them

Fig. 9C

STRIKING MEMBER INSTALLATION MECHANISM AND NAIL GUN HAVING SAME

CROSS-REFERENCE TO RELATED PATENT APPLICATIONS

This application claims priority to and benefit of Chinese Patent Application Nos. 202211035544.2, 202222261206.2, 202222263098.2, 202211035554.6, 202211034065.9, and 202222261203.9, all of which are filed on Aug. 26, 2022, and hereby incorporated by reference in their entireties.

FIELD OF THE INVENTION

This invention relates generally to fastening tools technology, and more particularly to a striking member installation mechanism and nail gun having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail gun is a fastening tool, commonly used in construction, which shoots nails by striking them with a striking member, e.g., a striking member. Due to the mechanical wear and tear during the striking process, the striking member can become worn out and deformed. As a result, after using it for a certain period, it becomes necessary to timely replace the striking member to avoid issues like reduced nail-driving force and potential safety hazards due to its deformation.

In current technology, most nail guns are electrically powered by lithium batteries. To replace the striking member, one needs to disassemble the entire outer casing. Only after removing the internal components can the striking member be replaced. Typically, the outer casing has two halves held together by six or more screws, and the internal components have a complex assembly. Therefore, for ordinary users, disassembling the nail gun and replacing the striking member can be quite challenging, time-consuming, and inconvenient. Moreover, small internal parts like pins and screws can easily be lost during disassembly, causing frustration for the user.

Therefore, a heretofore unaddressed needs exist in the art for a nail gun that makes it easier for ordinary users to replace the striking member and has relatively fewer components.

SUMMARY OF THE INVENTION

In one aspect, this invention relates to a nail gun having a striking member installation mechanism facilitating the installation and replacement of a striking member. The nail gun comprises a casing having a main casing body, and a striking member baffle removably disposed over a replacement opening of the main casing body; a striking member removably disposed inside the main casing body and below the striking member baffle; and a striking member driving assembly having a piston for driving the striking member in a reciprocating motion direction, wherein the striking member has a striking member tail, a protruding part extending perpendicularly to the reciprocating motion direction the striking member tail, and a guiding striking part; wherein the piston comprises a striking member connector having a protruding part receiving hole; wherein the striking member tail is in contact with a surface of the striking member connector; and wherein the protruding part is removably received in the protruding part receiving hole.

In one embodiment, the protruding part comprises a first square plate; extends from a first side of the protruding part and is integrally formed with the first side of the striking member tail; and the protruding part receiving hole comprises a rectangular hole matching the protruding part when the protruding part is received in the protruding part receiving hole.

In one embodiment, the length direction of the rectangular hole is perpendicular to the reciprocating motion direction.

In one embodiment, the striking member tail comprises a second square plate; and the guiding striking part comprises a long plate and is integrally formed with the striking member tail on a second side of the striking member tail.

In one embodiment, the protruding part comprises a cylindrical column and is integrally formed with the striking member tail; and the protruding part receiving hole comprises a circular hole matching the protruding part.

In one embodiment, the striking member tail comprises a second square plate, and the protruding part extends from a first surface of the striking member tail; wherein the guiding striking part comprises a long plate and is integrally formed with the striking member tail; wherein a width of the striking member tail is greater than a width of the guiding striking part.

In one embodiment, a pressure protrusion is disposed on a second surface of the striking member tail, and the pressure protrusion is formed at a position corresponding to the protruding part; wherein the pressure protrusion is in contact with a bottom surface of the striking member baffle.

In one embodiment, the striking member drive assembly comprises a striking member guiding groove matching the guiding striking part, and the striking member guiding groove has a guiding groove opening for receiving the striking member.

In one embodiment, a surface of the striking member baffle facing the striking member has a baffle latch, wherein the main casing body has a baffle latch slot receiving the baffle latch; wherein the striking member baffle and the main casing body are engaged with each other through an association between the baffle latch and the baffle latch slot.

In another aspect of the invention a nail gun comprises a casing having a main casing body, and a striking member baffle removably disposed over a replacement opening of the main casing body; a striking member removably disposed inside the main casing body and below the striking member baffle; and a striking member driving assembly having a piston for driving the striking member in a reciprocating motion direction, wherein the piston comprises a striking member connector having an upper surface facing the striking member baffle; wherein a connecting post extends from the upper surface towards the striking member baffle; wherein the striking member comprises a striking member tail and a guiding striking part; wherein the striking member tail is plate-shaped and comprises a mounting hole configured to receive the connecting post; wherein the striking member tail is configured to be in contact with the upper surface of the striking member connector when the connecting post is received in the mounting hole.

In one embodiment, an extension direction of the connecting post is perpendicular to the upper surface and perpendicular to the reciprocating direction, and an extension length of the connecting post is at least equal to a depth of the mounting hole.

In one embodiment, the connecting post is cylindrical, and the mounting hole comprises a circular hole matching the connecting post.

In one embodiment, the piston comprises a striking member positioning rim extending from a first side of the striking member connector; wherein the striking member tail is in contact with the striking member positioning rim.

In one embodiment, the striking member positioning rim comprises a first extending rim section extending from the first side of the striking member connector towards the striking member baffle, and a second extending rim section extending from an end of the first extending rim section; wherein the first extending rim section extension direction is perpendicular to the reciprocating movement; and the second extending rim section extension direction is parallel to the reciprocating movement direction.

In one embodiment, a first distance between the second extending rim section and the striking member connector is greater than a thickness of the striking member; and a second distance between the first extending rim section and the connecting post is greater than a third distance from one end of the striking member to the mounting hole.

In yet another aspect of the invention, a nail gun comprises a casing having a main casing body, and a striking member baffle removably disposed over a replacement opening of the main casing body; a striking member removably disposed inside the main casing body and below the striking member baffle; and a striking member driving assembly having a piston for driving the striking member in a reciprocating motion direction, wherein the striking member comprises a striking member mounting tail and a guiding striking part; and wherein the piston comprises a striking member connector having a striking member receiving slot for receiving the striking member mounting tail.

In one embodiment, a first side of the striking member mounting tail comprising a first force receiving surface, wherein the first side is away from the guiding striking part and is perpendicular to the reciprocating motion direction; a first edge of the striking member receiving slot is contact with the first force receiving surface when the striking member mounting tail is received in the striking member receiving slot.

In one embodiment, the guiding striking part and the striking member mounting tail are integrally formed.

In one embodiment, the striking member receiving slot comprises a square groove portion for receiving the striking member mounting tail; and a strip groove portion for partially receiving the guide striking part.

In one embodiment, the striking member comprises a second force receiving surface on a second side of the striking member at a junction between the striking member mounting tail and the guiding striking part; wherein the striking member receiving slot comprises a pair of limiting steps at a junction between the square groove portion and the strip groove portion; and wherein the pair of limiting steps is in contact with the second force receiving surface when the striking member is received in the in striking member receiving slot.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 9C is a flowchart of the striking member replacement process according to yet another embodiment of the invention.

DETAILED DESCRIPTION OF THE INVENTION

Figure 1:
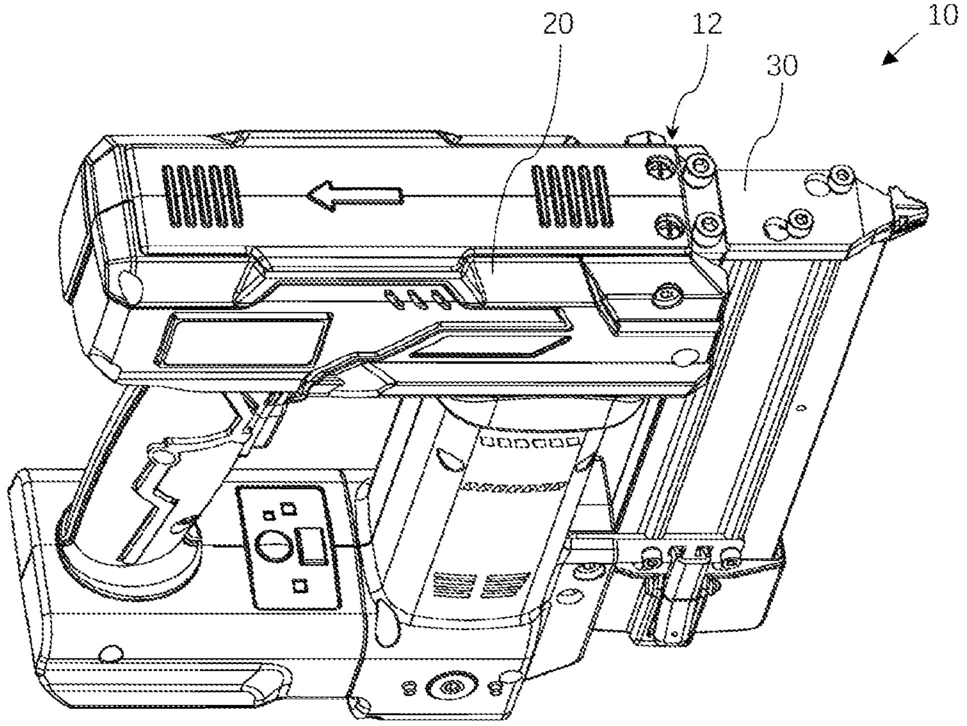
FIG. 1 is a schematic structural view of the nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to nail passage mechanism for lithium-ion battery nail gun. Embodiments of the invention are now described in conjunction with the accompanying drawings in FIGS. 1-20.

Embodiment 1

To solve the aforementioned problems, this invention provides a nail gun structure that allows for easy striking member installation and replacement and has fewer components. The technical solution adopted by this invention is described as follows.

The invention provides a nail gun that permits easy installation and replacement of the striking member. The nail gun includes a casing mechanism that includes a main casing and a striking member baffle that is detachably mounted to an opening of the main casing, and a striking member installed inside the main casing, positioned below the striking member baffle, used to drive nails.

A striking mechanism drives the striking member. The striking mechanism includes a piston part for driving the striking member in a predetermined reciprocating motion direction. The striking member features a striking member tail, a protruding part extending from the side of the striking member tail in a direction vertical to the reciprocation direction, and a guiding striking part for driving nails. The piston part has a striking member connector with a receiving hole that matches the protruding part of the striking member. The striking member tail is in contact with the surface of the striking member connector, and the protruding part is embedded in the receiving hole.

In one embodiment, the protruding part is square and flat, integrated with the striking member flat tail, and the receiving hole is a slot that matches the protruding part.

In one embodiment, the length direction of the slot is perpendicular to the reciprocating motion direction.

In one embodiment, the striking member tail is square and flat, the protruding part extends from the edge of the striking member tail, and the guiding striking part is elongated and integrated with the striking member tail.

In one embodiment, the protruding part is cylindrical, and the receiving hole which matches the protruding part is circular.

In one embodiment, a pressure protrusion is formed on the other side of the striking member tail, positioned to correspond with the protruding part. This pressure protrusion is in contact with a bottom surface of the striking member baffle.

In one embodiment, the muzzle mechanism in association with the striking member has a striking member guiding groove matching the guiding striking part of the striking member, with a striking opening for inserting the striking member. The projection of a replacement opening on the plane where the striking member guiding groove opening is located covers the striking member guiding groove opening.

In one embodiment, the direction of the striking member guiding groove opening aligns with the length direction of the replacement opening. The length of the replacement opening is greater than the length of the striking member, and its width is greater than the width of the striking member.

In one embodiment, the invention also includes multiple baffle fasteners for fixing the striking member baffle to the striking member drive assembly. The inner side of the baffle facing the striking member has a baffle latch, and the main casing has a baffle latch slot matching this baffle latch. The striking member baffle and main casing are snap-fitted together through the baffle latch and baffle latch slot. The striking member baffle also has multiple mounting through holes, and the striking member drive assembly has multiple baffle mounting holes. After the striking member baffle is snap-fitted with the main casing, the fasteners pass through the mounting through holes and the baffle mounting holes, allowing the striking member baffle to be detachably mounted to the main casing and the striking member drive assembly.

Effects and Results of the Invention

According to the nail gun of this invention, which facilitates the fast and easy replacement and installation of the striking member, since the striking member baffle is detachably mounted on the replacement opening of the main casing, and the position of the replacement opening corresponds to the mounting tail of the striking member, it is possible to remove the striking member baffle and replace the striking member through the replacement opening without having to disassemble the entire casing, or remove and reassemble numerous internal components. Due to the presence of a protruding part on the striking member tail that is perpendicular to the reciprocating motion direction, and the piston part having a receiving hole that matches this protruding part, the protruding part of the striking member can be embedded and fixed in the receiving hole on the piston part to connect the two. This eliminates the need for additional connectors like pins, screws, etc., reducing the number of components. It also prevents the loss of these smaller components, reduces installation steps, and greatly simplifies the striking member replacement process for ordinary users.

Embodiment 1-1

FIG. 1 is a schematic structural view of the nail gun according to one embodiment of the invention.

Figure 2A:
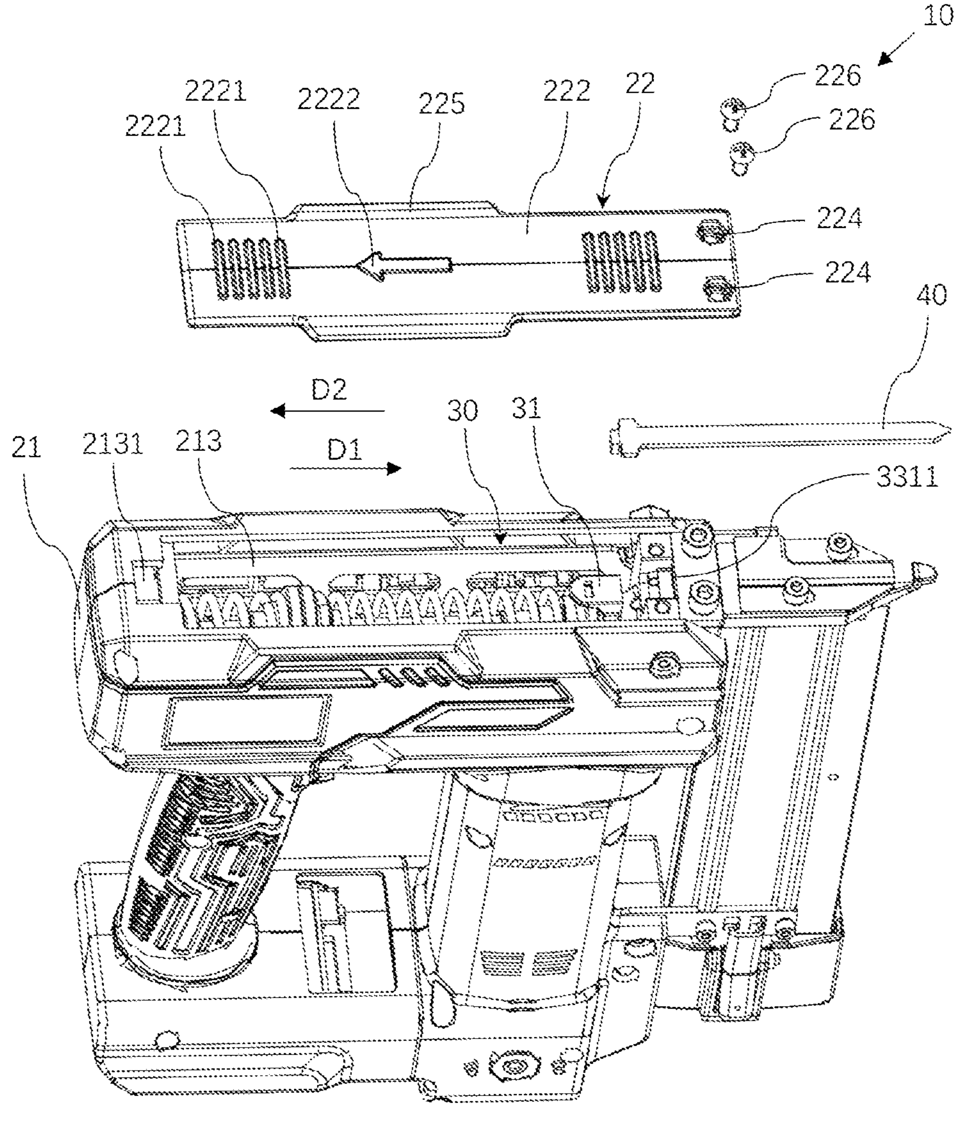
FIG. 2A is a partial exploded view of the nail gun with striking member baffle detached according to one embodiment of the invention.

FIG. 2A is a partial exploded view of the nail gun according to one embodiment of the invention.

Figure 3A:
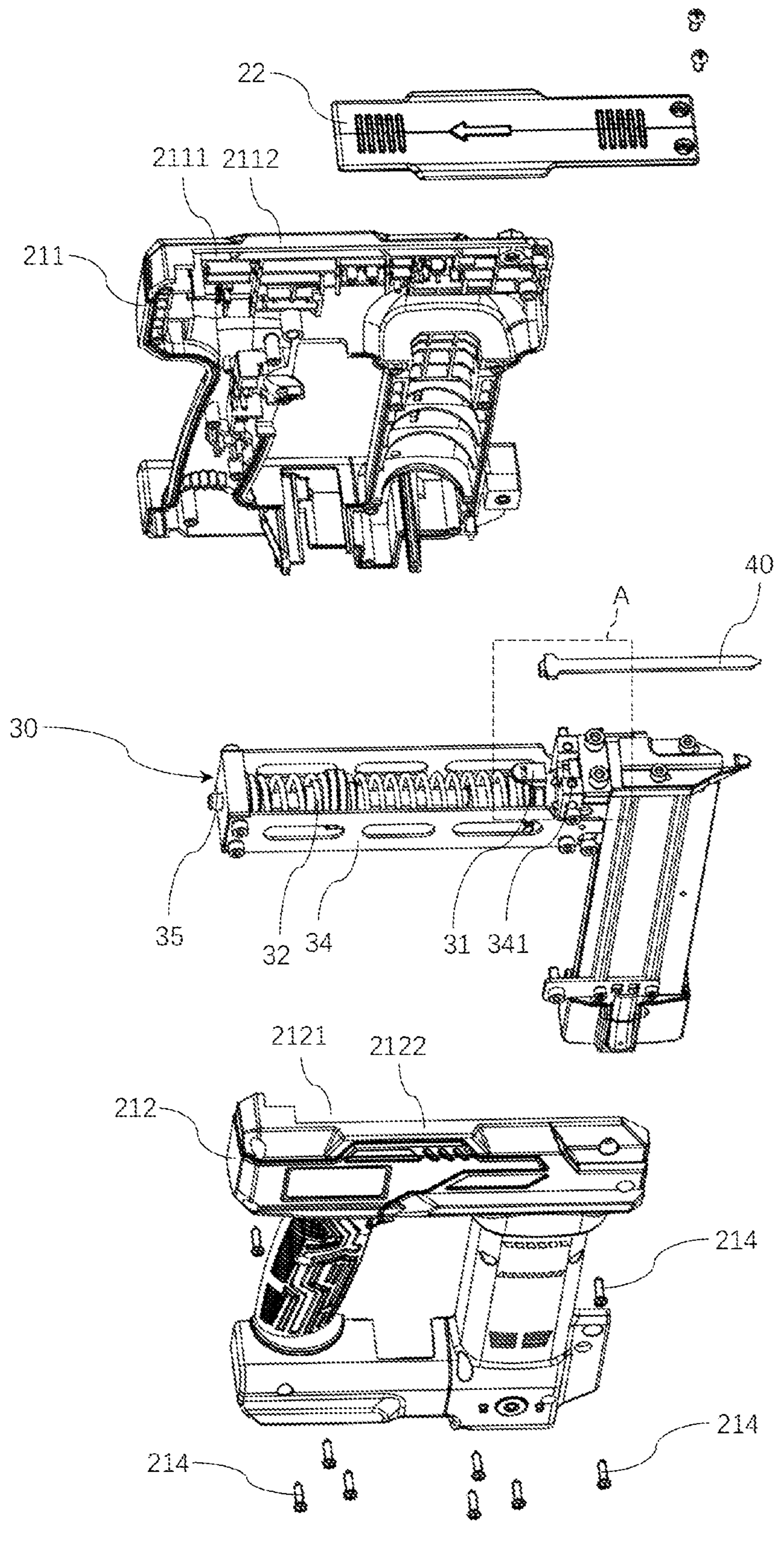
FIG. 3A is an exploded view of the nail gun according to one embodiment of the invention.

FIG. 3A is an exploded view of the nail gun according to one embodiment of the invention.

As shown in FIGS. 1, 2A, and 3A, the nail gun 10 according to one embodiment of the invention includes a striking member rapid installation mechanism 12 and a striking member 40. The nail gun 10 also includes conventional internal components such as a motor and battery (not shown in the figure) disposed inside the casing 20, which will not be described in detail here as they are known in the art.

The striking member installation mechanism 12 is used for quickly installing and replacing the striking member 40 mounted inside the nail gun 10. The striking member installation mechanism 12 includes an external casing 20 and a striking member drive assembly 30 disposed inside the casing 20. In one embodiment, the striking member 40 moves in a predetermined reciprocating motion direction driven by the striking member drive assembly 30, as indicated by arrow D1 in FIG. 2A, which represents the nail striking direction, and arrow D2 indicates the spring energy storage direction opposite to the nail striking direction. The reciprocating motion direction includes both the nail striking direction and the spring energy storage direction.

The casing 20 includes a main casing 21 and a striking member baffle 22.

The main casing 21 is used to accommodate the aforementioned striking member drive assembly 30, striking member 40, motor, battery, and other internal components, and provides protection for these internal components. The main casing 21 includes a left outer casing 211, a right outer casing 212, and multiple casing fasteners 214. In this embodiment, the terms "left," "right," "top," and "bottom" are relative to the operator's perspective when holding the nail gun to shoot nails.

The left outer casing 211 and the right outer casing 212 can be fitted together to form an integral main casing 21 and can be fastened by multiple casing fasteners 214. In this embodiment, the casing fasteners 214 are rivets that match the casing installation holes on the left outer casing 211 and the right outer casing 212.

The top of the left outer casing 211 has a left shell notch 2111, and the right outer casing 212 has a right shell notch 2121 that matches the left shell notch 2111. When the left outer casing 211 and the right outer casing 212 are fitted together, the left shell notch 2111 and the right shell notch 2121 combine to form a replacement opening 213, i.e., the main casing 21 has a replacement opening 213 for installing and replacing the striking member 40.

The replacement opening 213 is generally rectangular, with a length greater than that of the striking member 40 and a width greater than that of the striking member 40, making it convenient to remove and replace the striking member 40 through the replacement opening 213. One end of the replacement opening 213, away from the striking member 40, has a baffle positioning notch 2131.

The inner surfaces of the left outer casing 211 and the right outer casing 212 also have grid-shaped reinforcement ribs and structures for supporting and fixing internal components such as the motor. The left outer casing 211 and the right outer casing 212 also have multiple cooling and exhaust holes. The specific structure of the left outer casing 211 and the right outer casing 212 is not further detailed as it is known in the art.

The striking member baffle 22 can be detachably mounted on the replacement opening 213. When the striking member baffle 22 is removed, the replacement opening 213 is exposed, and the striking member 40 can be conveniently installed and/or replaced through the replacement opening 213. When the striking member baffle 22 is installed, the main casing 21 and the striking member baffle 22 together form an integral external casing 20 with higher overall structural strength. It also completely encloses the striking member 40, motor, and other internal components within the external casing 20, providing protection for these internal components and also offering protection to the operator during the nailing process.

Figure 4:
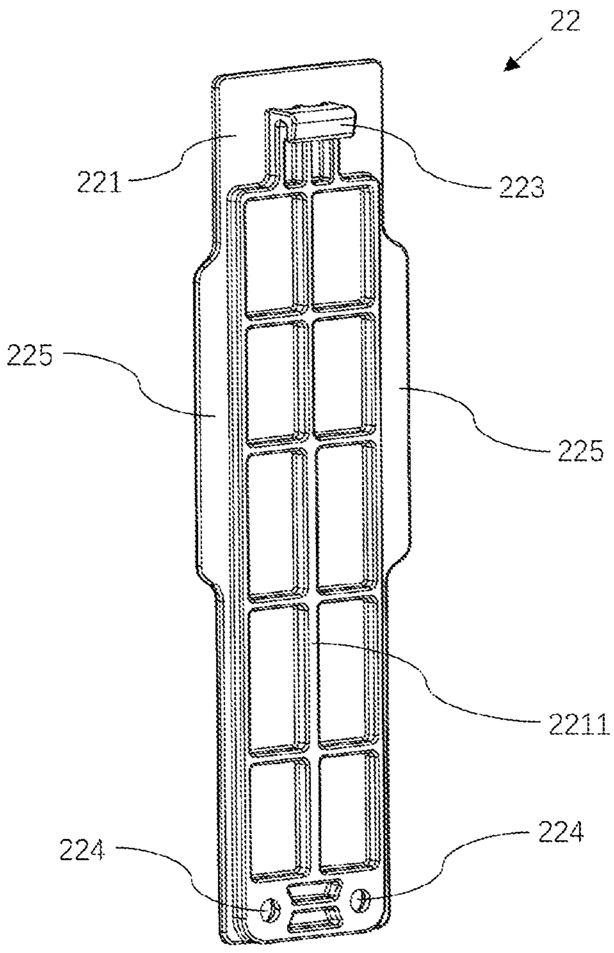
FIG. 4 is a schematic structural view of a striking member baffle according to one embodiment of the invention.

FIG. 4 is a schematic structural view of a striking member baffle according to one embodiment of the invention.

As shown in FIGS. 2A and 4, the striking member baffle 22 includes a baffle inner side 221 and a baffle outer side 222. When the striking member baffle 22 is installed on the replacement opening 213, the baffle inner side 221 faces the striking member 40. The striking member baffle 22 also includes a baffle latch 223, a pair of baffle installation holes 224, and a pair of baffle supporting wings 225.

The baffle inner side 221 of the baffle has a grid-like reinforcement, which is used to strengthen the structural strength of the striking member baffle 22. In one embodiment, the reinforcement has multiple protrusions, one of which in the middle is the middle protrusion 2211, and its extension direction is consistent with the length direction of the striking member baffle 22.

Figure 5:
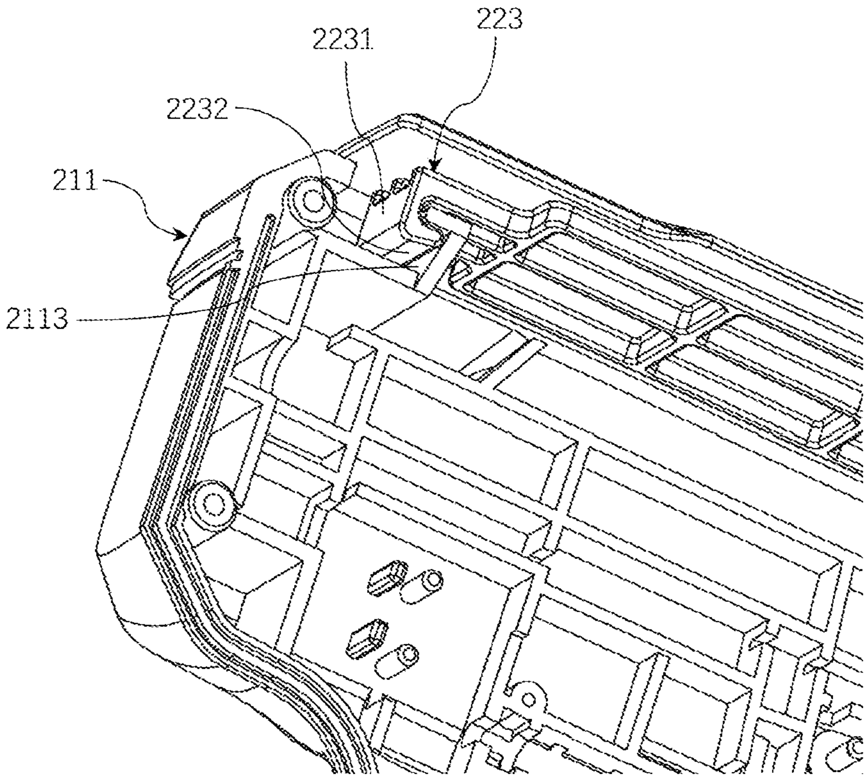
FIG. 5 is a schematic structural view of a snap-fit structure between a baffle latch and a baffle latch slot according to one embodiment of the invention.

FIG. 5 is a schematic structural view of a snap-fit structure between a baffle latch and a baffle latch slot according to one embodiment of the invention.

As shown in FIGS. 4-5, the baffle latch 223 locates on the baffle inner side 221 of the baffle. The baffle latch 223 matches the baffle latch slot 2113 of the left outer shell 211. The striking member baffle 22 and the main casing 21 can be latched together by the baffle latch 223 and the baffle latch slot 2113, thereby limiting the movement of the striking member baffle 22 in the nail striking direction.

Specifically, the baffle latch 223 includes a first baffle latch extension 2231 extending roughly vertically downward from the baffle inner side 221 of the baffle and a second baffle latch extension 2232 extending along the length direction of the striking member baffle 22 from the end of the first baffle latch extension 2231. The second baffle latch extension 2232 extends into the baffle latch slot 2113 to make the baffle latch 223 engage with the baffle latch slot 2113. The baffle latch 223 also matches the baffle positioning notch 2131. When installing, the baffle latch 223 can be positioned to a predetermined loading position through the baffle positioning notch 2131, which is the opening of the baffle latch slot 2113. That is, align the baffle latch 223 with the baffle positioning notch 2131 and press it down. Then, push the striking member baffle 22 along the nail striking direction to make the baffle latch 223 engage with the baffle latch slot 2113. To disengage the baffle 22 from the main casing 21, push the striking member baffle 22 along the energy storage direction so as to make the baffle latch 223 disengage from the baffle latch slot 2113.

The baffle outer side 222 of the baffle has multiple non-slip protrusions 2211, which are used to increase friction when pushing the striking member baffle 22 to make the baffle latch 223 latch or disengage. The multiple non-slip protrusions 2211 are arranged in the direction of the reciprocating movement mentioned above and are evenly spaced. The length direction of each non-slip protrusion 2211 is perpendicular to the reciprocating motion direction.

The baffle installation holes 224 are used to install the striking member baffle 22 on the striking member driving assembly 30. Two baffle fasteners 226 pass through the two installation holes 224 and a striking member holding piece 331 on the striking member driving assembly 30, fixing the striking member baffle 22 to the striking member driving assembly 30. The installation holes 224 and the baffle latch 223 respectively locate the two sides of the striking member baffle 22 along its length direction, where the installation holes 224 locate on the side closer to the striking member 40.

The baffle supporting wings 225 are used to support the striking member baffle 22 after it is installed on the main casing 21, preventing the striking member baffle 22 from being jammed into the replacement opening 213 due to force. The pair of baffle supporting wings 225 are located on both sides of the striking member baffle 22 along its width direction and correspond in shape and position to a pair of wing supports (i.e., the left wing support 2112 and the right wing support 2122). After the striking member baffle 22 is installed on the main casing 21, the pair of baffle supporting wings 225 are in contact with the pair of wing supports.

The striking member driving assembly 30 is used to drive the striking member 40 to move along a predetermined reciprocating direction. The striking member driving assembly 30 includes a piston part 31, a spring 32, a muzzle mechanism 33, a regulation frame mechanism 34, and a guide rod 35.

The piston part 31 is used to drive the striking member 40 to move along a predetermined reciprocating direction. The piston part 31 has a receiving hole 312 for fixing and installing the striking member 40.

Figure 6:
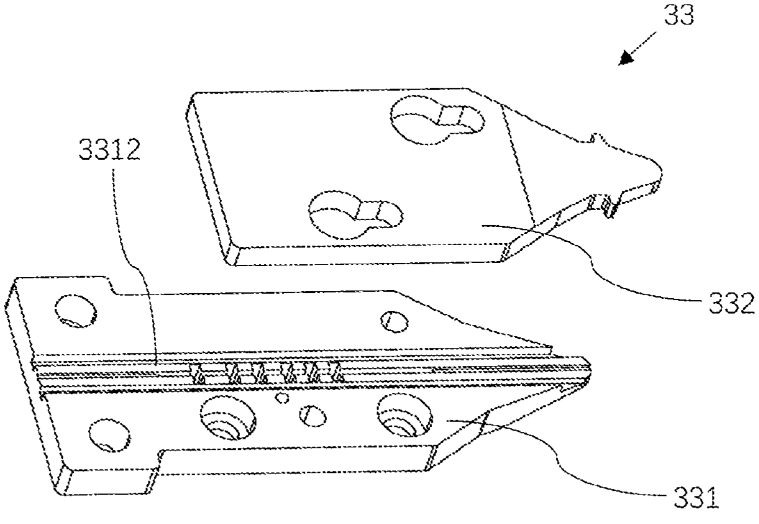
FIG. 6 is an exploded view of a muzzle mechanism according to one embodiment of the invention.

FIG. 6 is an exploded view of a muzzle mechanism according to one embodiment of the invention.

As shown in FIGS. 2A and 6, the piston part 31 has a striking member connector 311 extending vertically upward from its main body in a direction perpendicular to the reciprocating motion direction. A receiving hole 312 is provided on the striking member connector 311 for connecting the striking member 40. In one embodiment, the receiving hole 312 is a rectangular strip hole, with its length direction perpendicular to the reciprocating motion direction. Moreover, once installed, the upper surface of the striking member connector 311 of piston part 31 is parallel to the direction of reciprocation.

In one embodiment, a spring 32 provides power for the movement of piston part 31.

In one embodiment, the muzzle mechanism 33 is used to accommodate the striking member 40 and limits the movement of striking member 40 when it strikes the nail.

FIG. 6 is an exploded view of a muzzle mechanism according to one embodiment of the invention.

As shown in FIGS. 2A and 6, the muzzle mechanism 33 includes a striking member holding piece 331 and a muzzle cover 332.

The striking member holding piece 331 has a groove. When the striking member holding piece 331 and muzzle cover 332 are assembled together, the groove and the surface of the muzzle cover 332 facing the groove form a striking member guiding groove 3312 for accommodating the striking member 40. The striking member guiding groove 3312 has a guiding groove opening 3311 consistent with the direction of the replacement opening 213 for inserting and removing the striking member 40. As shown in FIG. 2A, the projection of the replacement opening 213 on the plane where the guiding groove opening 3311 is located covers the guiding groove opening 3311. That is, the replacement opening 213 exposes the guiding groove opening 3311 completely.

The regulation frame mechanism 34 is used to regulate and limit the movement of piston part 31 during the nailing process and the energy storage process. The regulating frame 33 is rectangular, and both piston part 31 and spring 32 are disposed within the regulating frame 33, with the two parallel regulating side plates of the regulating frame 33 holding the piston part 31. The piston part 31 locates on the side near the nailing mouth, one end of spring 32 abuts piston part 31, and the other end abuts the side of the regulating frame 33 away from the nailing mouth.

The location of the regulating frame 34 near the nailing mouth has the two aforementioned baffle mounting holes, which match the aforementioned baffle fasteners 226.

Guide rod 35 works with regulating frame 34 to regulate and limit the movement of piston part 31. One end of the guide rod 35 is fixedly mounted on the piston part 31, the other end connects to the side of the regulating frame 34 away from the nailing mouth, and the extension direction of guide rod 35 is consistent with the predetermined reciprocating direction. Spring 32 is installed on guide rod 35.

The striking member 40 is used to strike nails.

Figure 7A:
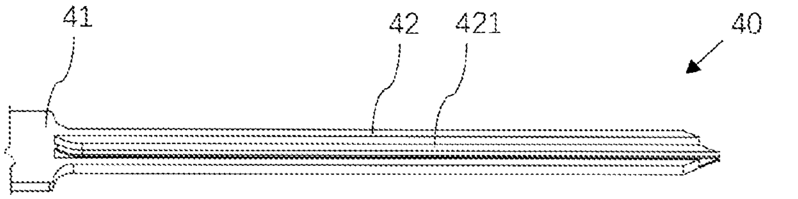
FIG. 7A is a schematic structural view of a striking member according to one embodiment of the invention.

FIG. 7A is a schematic structural view of a guiding striking part of the striking member according to one embodiment of the invention.

Figure 8A:
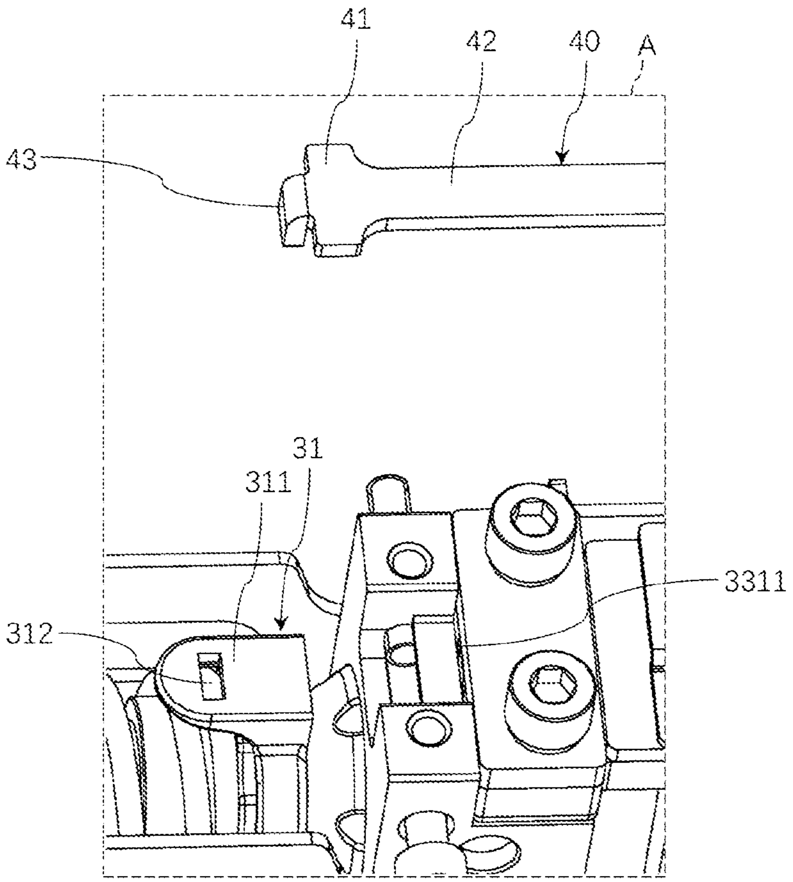
FIG. 8A is an enlarged view of part A in FIG. 3A.

FIG. 8A is an enlarged view of part A in FIG. 3.

As shown in FIGS. 2A, 6, 7A and 8A, the striking member 40 includes a striking member tail 41, a guiding striking part 42, and a protruding part 43, all of which are integrally formed.

The striking member tail 41 and protruding part 43 are used to mount the striking member 40 to the striking member drive component 30.

In one embodiment, the striking member tail 41 is square and plate-shaped, and the protruding part 43 is also square and plate-shaped. The width of the protruding part 43 is smaller than the width of the striking member tail 41. The protruding part 43 extends vertically from the edge of the striking member tail 41 away from the guiding striking part 42. That is, the extension direction of the protruding part 43 is also perpendicular to the reciprocating motion direction. The receiving hole 312 on piston part 31 matches the protruding part 43, and the depth of the receiving hole is also roughly consistent with the length by which the protruding part 43 extends.

In one embodiment, the guiding striking part 42 is used to strike nails and is long and plate-shaped, connected to one side of the striking member tail 41. In one embodiment, the connection between the striking member tail 41 and guiding striking part 42 is curved.

In one embodiment, one side of the guiding striking part 42 has a guiding recess 421, which is used to regulate the direction of movement of the striking member 40 during the nailing process. The extension direction of guiding recess 421 is consistent with the length direction of the striking member 40. The aforementioned striking member guiding groove 3312 also has a groove-like structure matching guiding recess 421, so the guiding striking part 42 can be inserted into the striking member guiding groove 3312 on the striking member holding piece 331 from the guiding groove opening 3311 and can slidably fit with the striking member guiding groove 3312.

When the striking member 40 is installed on piston part 31, the protruding part 43 of the striking member 40 fits into the receiving hole 312 (strip hole) of piston part 31, the striking member tail 41 of the striking member contacts the upper surface of the striking member connector 311 of piston part 31, and the guiding striking part 42 fits into the striking member guiding groove 3312. During nailing (i.e., when piston part 31 moves in direction D1) and during spring 32 energy storage (i.e., when the piston moves in direction D2), force can be applied to the striking member 40 through the receiving hole 312. Moreover, when piston part 31 drives the striking member 40 to move, the movement direction of the striking member 40 can be further regulated by the receiving hole perpendicular to the movement direction, preventing any deviation and enhancing the stability of nailing.

Therefore, after removing the striking member baffle 22, the replacement opening 213 is exposed, and the striking member tail 41 of the striking member 40 and the corresponding striking member fastener 44 are exposed from the replacement opening 213. At this time, the striking member 40 to be replaced can be conveniently removed. After removing the striking member 40 to be replaced, the guiding groove opening 3311 is exposed from the replacement opening 213, and a new striking member 40' can be conveniently inserted into the striking member guiding groove 3312 through the guiding groove opening 3311 for installation.

Figure 9A:
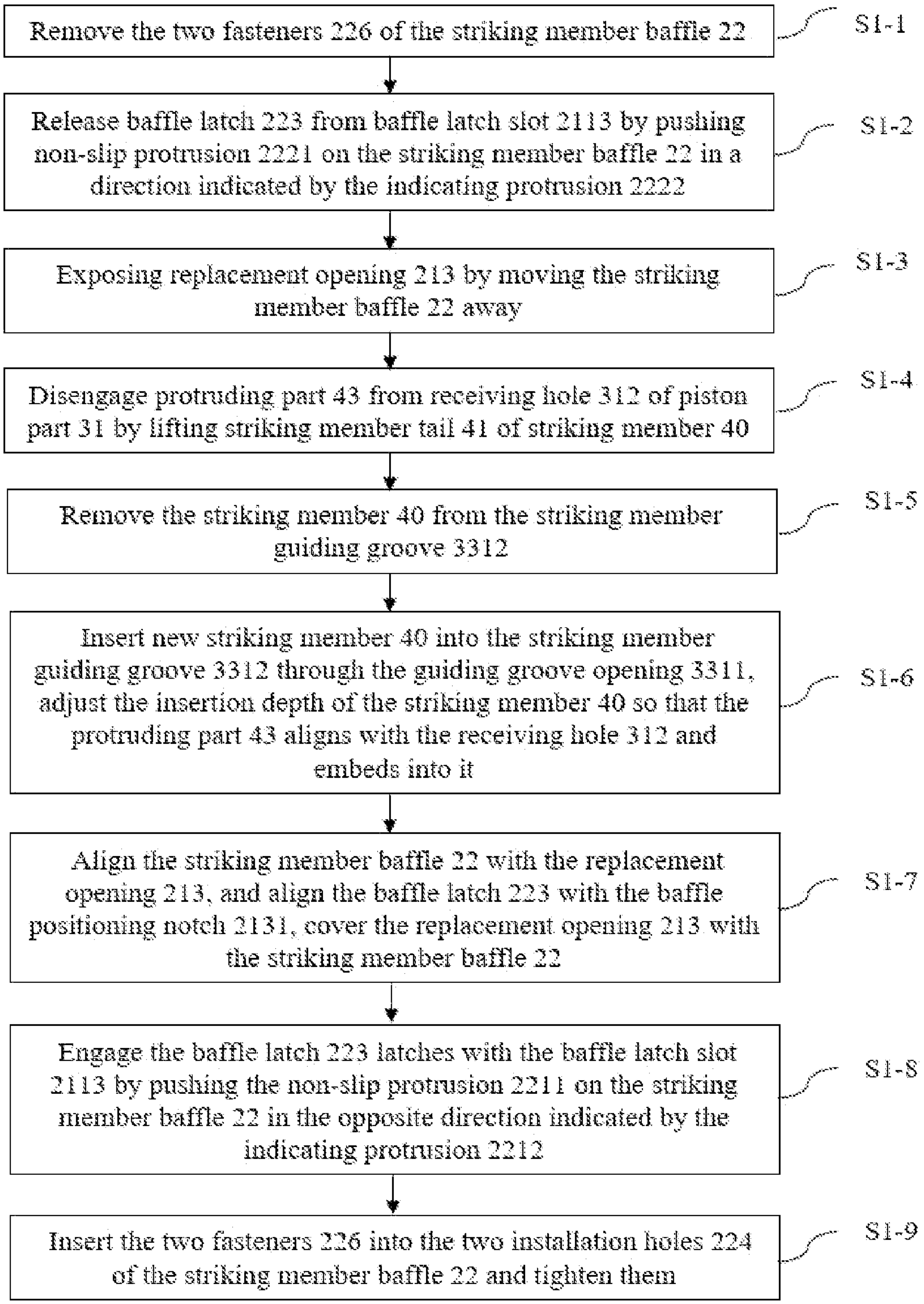
FIG. 9A is a flowchart of the striking member replacement process according to one embodiment of the invention.

FIG. 9A is a flowchart of the striking member replacement process according to one embodiment of the invention.

As shown in FIG. 9A, based on the nail gun 10 and the striking member installation mechanism 12 according to one embodiment of the invention, the process of replacing the striking member 40 in the nail gun 10 includes the following steps.

Step S1-1: Use a screwdriver to remove the two fasteners 226 of the striking member baffle 22, then proceed to step S1-2.

Step S1-2: Hold the non-slip protrusion 2221 on the striking member baffle 22 and push it in the direction indicated by the indicating protrusion 2222, so that the baffle latch 223 is released from the baffle latch slot 2113, then proceed to step S1-3.

Step S1-3: Move the striking member baffle 22 away, exposing the replacement opening 213, then proceed to step S1-4.

Step S1-4: Lift the striking member tail 41 of the striking member 40 to be replaced so that the protruding part 43 is disengaged from the receiving hole 312 of the piston part 31, then proceed to step S1-5.

Step S1-5: Remove the striking member 40 to be replaced from the striking member guiding groove 3312, then proceed to step S1-6.

Step S1-6: Insert the new striking member 40 into the striking member guiding groove 3312 through the guiding groove opening 3311, adjust the insertion depth of the striking member 40 so that the protruding part 43 aligns with the receiving hole 312 of the piston part 31 and embeds into it, then proceed to step S1-7.

Step S1-7: Align the striking member baffle 22 with the replacement opening 213, and align the baffle latch 223 with the baffle positioning notch 2131, cover the replacement opening 213 with the striking member baffle 22, then proceed to step S1-8.

Step S1-8: Hold the non-slip protrusion 2211 on the striking member baffle 22 and push it in the opposite direction indicated by the indicating protrusion 2212, so that the baffle latch 223 latches into the baffle latch slot 2113, then proceed to step S1-9.

Step S1-9: Insert the two fasteners 226 into the two installation holes 224 of the striking member baffle 22 and tighten them with a screwdriver, then proceed to the end state.

As described above, the striking member installation mechanism 12 and the nail gun 10 of this embodiment can quickly and easily replace the striking member 40 by disassembling the striking member baffle 22 and accessing the replacement opening 213, and can equally easily reinstall the striking member baffle 22, allowing the nail gun 10 to quickly return to a working state.

Effect of Embodiment 1-1

The nail gun provided in this embodiment, which facilitates quick and easy replacement of striking members, has a removable striking member baffle mounted on a replacement opening in the outer casing, which corresponds to the tail end of the striking member. Therefore, the striking member baffle can be removed, and the striking member can be replaced through the replacement opening without having to open the entire casing, remove and reinstall many internal components. Because the striking member tail has a protruding part that is perpendicular to the reciprocating movement direction and the piston part has a receiving hole that matches the protruding part, the striking member's protruding part can be embedded and fixed in the receiving hole of the piston part, connecting the two without the need for pins, screws, or other connectors. This reduces the number of parts and avoids the loss of smaller parts, as well as simplifying installation steps, making it easier for ordinary users to replace the striking member.

Specifically, in one embodiment, the striking member tail is shaped like a square plate, and the protruding part extends vertically from the edge of the striking member's tail end, also shaped like a square plate but narrower than the tail end. The receiving hole in the piston part has a matching bar-shaped hole, with the length direction perpendicular to the piston's movement direction. Therefore, inserting the square plate-shaped protruding part into the bar-shaped hole connects the piston part and the striking member, making installation quick and easy.

Furthermore, the guiding striking part of the striking member has a guiding groove consistent with the nailing direction, and the striking member guiding groove has a matching structure, which can regulate the movement direction of the striking member during the nailing process, improving nailing stability. By using the bar-shaped hole in the piston part, which is perpendicular to the nailing direction, the movement of the striking member tail end can be further regulated, preventing deviation during motion and further enhancing nailing stability.

Embodiment 1-2

Figure 10A:
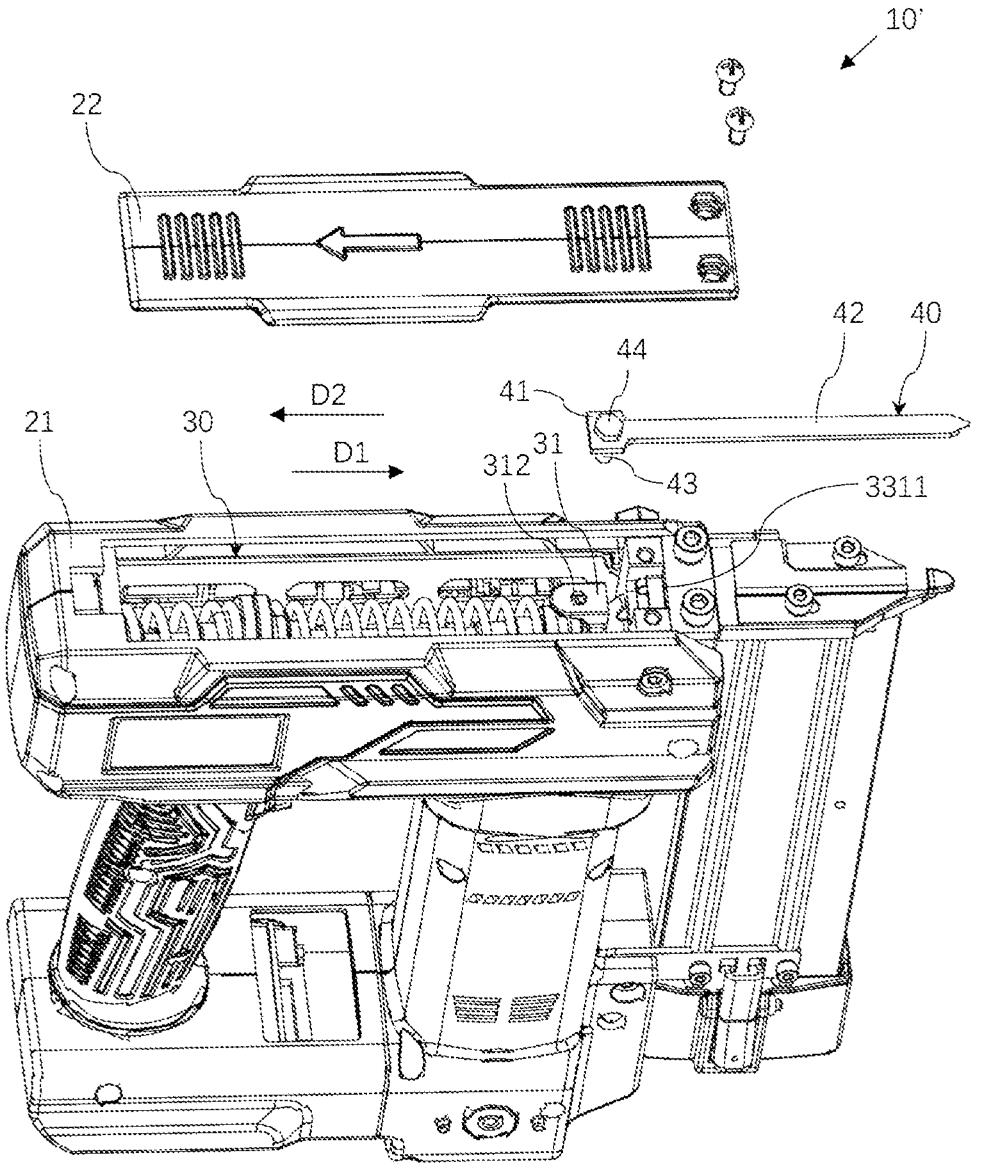
FIG. 10A is a structural exploded view of the nail gun according to one embodiment of the invention.

FIG. 10A is a structural exploded view of the nail gun according to another embodiment of the invention.

Figure 11:
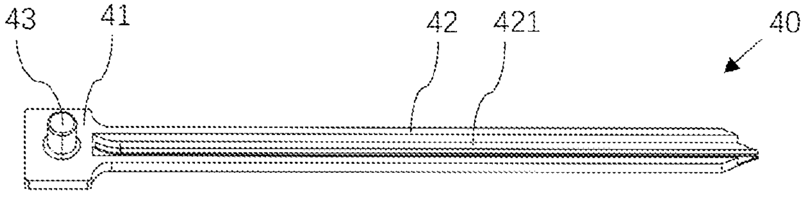
FIG. 11 is a schematic structural view of the striking member according to the embodiment of FIG. 10A.

FIG. 11 is a schematic structural view of the striking member according to the embodiment of FIG. 10A.

As shown in FIGS. 10A and 11, this embodiment provides a nail gun 10' that facilitates the replacement and installation of the striking member 40. Compared to Embodiment 1-1, the difference lies in the structures of the striking member 40 and the striking member connector 311 of the piston part 31 in this embodiment.

In this embodiment, the striking member 40 includes the striking member tail 41, the guiding striking part 42, the protruding part 43, and the pressure protrusion 44, all of which are integrally formed.

In one embodiment, the striking member tail 41 is also a square plate shape, with its length being longer than in Embodiment 1-1, while its width and thickness remain the same as in Embodiment 1-1.

In one embodiment, the protruding part 43' is cylindrical and extends perpendicularly from the center of one side of the striking member tail 41 in the reciprocating direction. The striking member connector 311 of the piston part 31 also has a receiving hole 312', which is a circular hole that matches the protruding part 43'. The length of the protruding part 43' is roughly equal to the depth of the circular hole.

The pressure protrusion 44 is formed on the other side of the striking member tail 41 and is located at a position corresponding to the protruding part 43. In one embodiment, the top of the pressure protrusion 44 is arc-shaped. After the striking member baffle 22 is installed, the top of the pressure protrusion 44 abuts against the middle protrusion 2211 on the bottom surface of the striking member baffle 22. Throughout the entire reciprocating motion, the striking member baffle 22 abuts against the pressure protrusion 44, further regulating the movement of the striking member 40.

In this embodiment, the structure of the guiding striking part 42 is the same as in Embodiment 1-1.

In this embodiment, other structures and the replacement steps for the striking member 40 are the same as in Embodiment 1-1, so they are not repeated here.

Effects of Embodiment 1-2

According to this embodiment, which provides a nail gun that facilitates the quick replacement and installation of the striking member, the nail gun has a detachable striking member cover, a protruding part on the striking member, and a receiving hole on the piston part that matches the protruding part. Therefore, it is also possible to achieve convenient replacement and installation of the striking member.

Further, in this embodiment, the protruding part of the striking member is cylindrical, and the receiving hole on the piston part is a matching circular hole, making it easier to process. During installation, it is also easier to insert the cylindrical protruding part into the circular hole. In addition, the protruding part extends perpendicularly from one side of the striking member tail, and on the other side of the striking member tail, there is a pressure protrusion at the corresponding position. After the striking member baffle is installed, the pressure protrusion abuts against the bottom surface of the striking member baffle, further restricting the movement of the striking member during the piston-driven movement, enhancing the stability and safety of the nailing process.

The above embodiments are only for illustrating the specific implementation methods of this invention, and the scope of this invention is not limited to the descriptions of these embodiments.

In the above embodiments, the striking member tail 41, the guiding striking part 42, the protruding part 43, and the pressure protrusion 44 are all integrally formed. In alternative solutions, the protruding part 43 and the pressure protrusion 44 can also be a pin. The striking member tail 41 has an installation hole that matches the pin. The pin is inserted into the installation hole and fixed by welding, which can also achieve the corresponding technical effects.

Embodiment 2

In this embodiment, the nail gun having the striking member installation mechanism includes a main casing and a striking member baffle removably attached to a replacement opening of the main casing; a striking member located inside the main body and positioned below the striking member baffle, used for striking nails; and a striking member driving mechanism, including a piston part for driving the striking member to move in a predetermined reciprocating direction. The piston part has a striking member connector, the surface of the striking member connector facing the baffle serves as a supporting surface, and the striking member connector has a connecting post that extends from the supporting surface toward the striking member baffle. The striking member is plate-shaped as a whole, and has a striking member tail for attaching the striking member to the piston part, and a guiding striking part for striking nails. The striking member tail of the striking member is plate-shaped and has a striking member mounting hole matching the connecting post. The striking member tail of the striking member abuts against the supporting surface, and the connecting post is embedded in the striking member mounting hole.

In one embodiment, the extending direction of the connecting post is perpendicular to the supporting surface and also perpendicular to the reciprocating movement direction.

In one embodiment, the connecting post is cylindrical, and the mounting hole is a circular hole matching the connecting post.

In one embodiment, the piston part also has a striking member positioning rim for positioning the striking member tail. The striking member is square plate-shaped, and the striking member positioning rim extends from the edge of the striking member connector away from the muzzle of the nail gun toward the striking member baffle. The tail end of the striking member abuts against the striking member positioning rim.

In one embodiment, the striking member positioning rim is hook-shaped, including: a first extending rim section, extending from the edge of the striking member connector away from the muzzle of the nail gun toward the striking member baffle, and extending in a direction perpendicular to the reciprocating movement; and a second extending rim section, extending from the end of the first extending section toward the muzzle, and extending in a direction parallel to the reciprocating movement direction.

In one embodiment, the distance between the second extending rim section and the striking member connector is greater than the thickness of the striking member, and the distance between the first extending rim section and the connecting post is greater than the distance from one end of the striking member to the striking member mounting hole.

In one embodiment, the striking member driving mechanism has a striking member guiding groove matching the guiding striking part. The striking member guiding groove has a placement slot opening for putting in the striking member. The replacement opening in the plane where the placement slot opening is located covers the placement slot opening.

In one embodiment, the direction of the placement slot opening is consistent with the length direction of the replacement opening. The length of the replacement opening is greater than the length of the striking member, and the width of the replacement opening is greater than the width of the striking member.

As disclosed in this invention, since the striking member baffle can be removably installed on the replacement opening of the main casing, and the replacement opening position corresponds to the striking member, it is possible to remove the striking member baffle and replace the striking member through the replacement opening without disassembling the entire housing or removing and installing a large number of internal components. Moreover, because the striking member has a striking member mounting hole and the piston part has a cylindrical connecting post matching the striking member mounting hole of the striking member, the two can be connected by simply embedding the connecting post on the piston part into the mounting hole of the striking member, without the need for setting pins, screws or other connectors. This reduces the number of components and avoids the loss of these smaller components, while also reducing the steps of replacement and installation. For ordinary users, this greatly simplifies the operation of replacing the striking member.

Embodiment 2-1

FIG. 1 is a schematic structural view of the nail gun according to one embodiment of the invention.

Figure 2B:
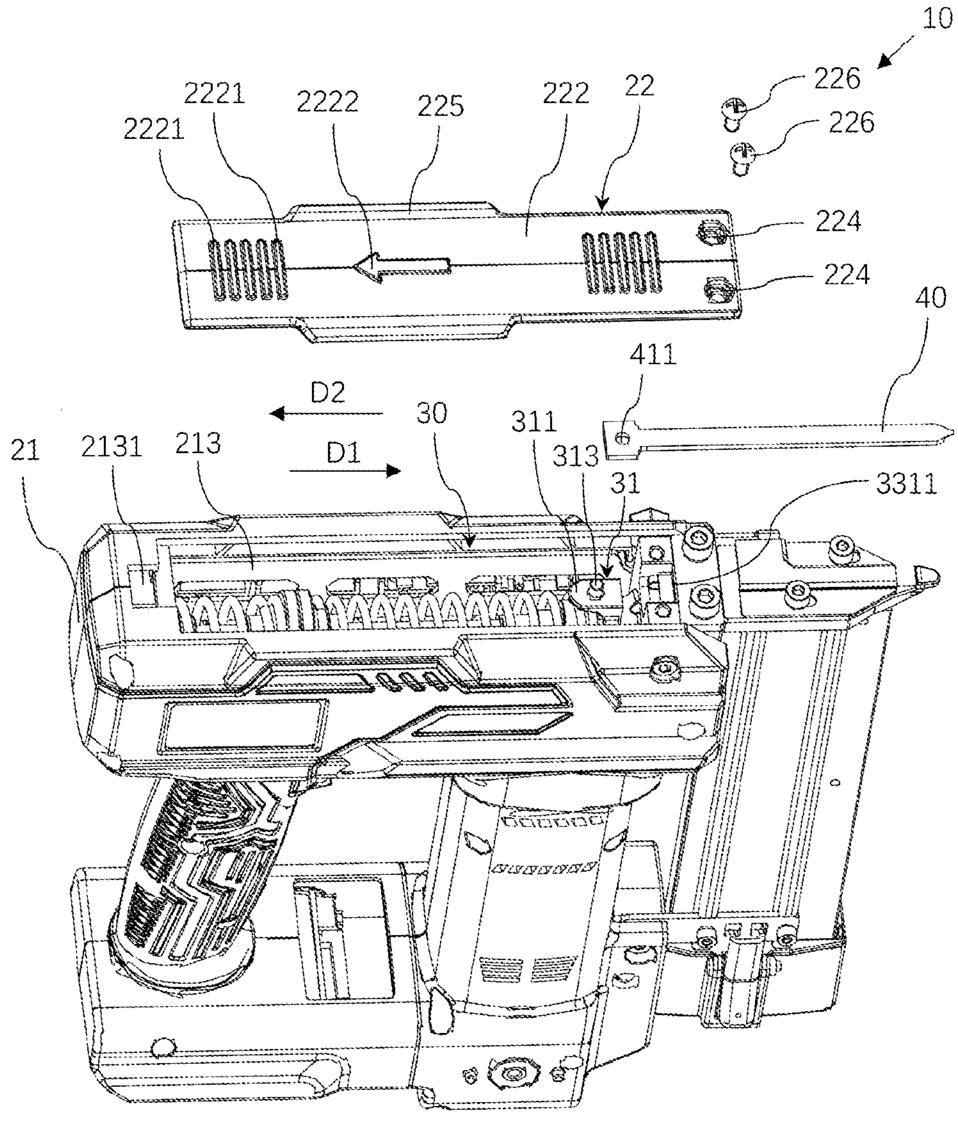
FIG. 2B is a partial exploded view of the nail gun with striking member baffle detached according to another embodiment of the invention.

FIG. 2B is a partial exploded view of the nail gun according to one embodiment of the invention.

Figure 3B:
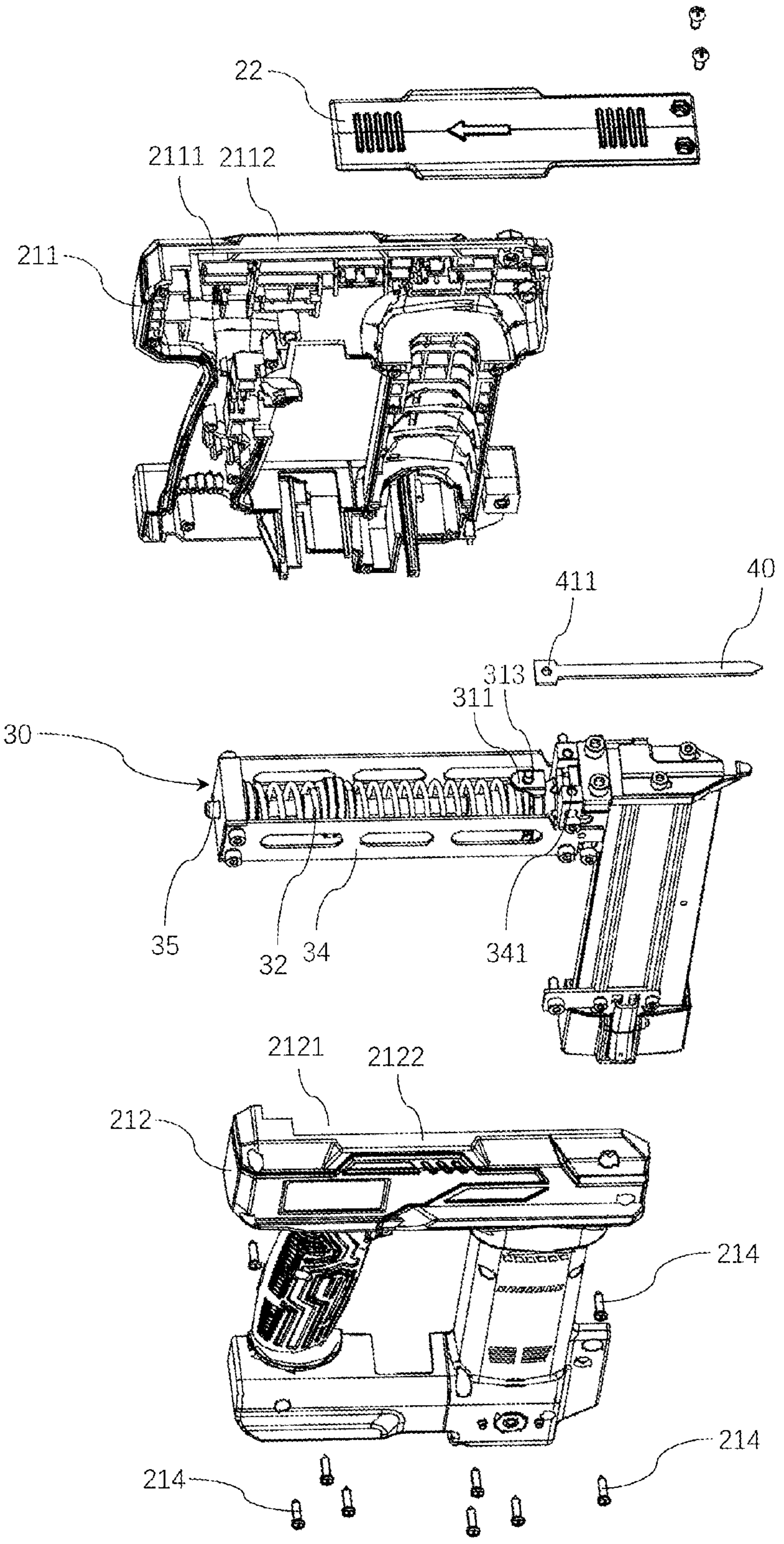
FIG. 3B is an exploded view of the nail gun according to another embodiment of the invention.

FIG. 3B is an exploded view of the nail gun according to one embodiment of the invention.

As shown in FIGS. 1, 2B and 3B, the nail gun 10 according to one embodiment of the invention includes a striking member rapid installation mechanism 12 and a striking member 40. The nail gun 10 also includes conventional internal components such as a motor and battery (not shown in the figure) disposed inside the casing 20, which will not be described in detail here as they are known in the art.

The striking member installation mechanism 12 is used for quickly installing and replacing the striking member 40 mounted inside the nail gun 10. The striking member installation mechanism 12 includes an external casing 20 and a striking member drive assembly 30 disposed inside the casing 20. In one embodiment, the striking member 40 moves in a predetermined reciprocating motion direction driven by the striking member drive assembly 30, as indicated by arrow D1 in FIG. 2B, which represents the nail striking direction, and arrow D2 indicates the spring energy storage direction opposite to the nail striking direction. The reciprocating motion direction includes both the nail striking direction and the spring energy storage direction.

The casing 20 includes a main casing 21 and a striking member baffle 22.

The main casing 21 is used to accommodate the aforementioned striking member drive assembly 30, striking member 40, motor, battery, and other internal components, and provides protection for these internal components. The main casing 21 includes a left outer casing 211, a right outer casing 212, and multiple casing fasteners 214. In this embodiment, the terms “left,” “right,” “top,” and “bottom” are relative to the operator’s perspective when holding the nail gun to shoot nails.

The left outer casing 211 and the right outer casing 212 can be fitted together to form an integral main casing 21 and can be fastened by multiple casing fasteners 214. In this embodiment, the casing fasteners 214 are rivets that match the casing installation holes on the left outer casing 211 and the right outer casing 212.

The top of the left outer casing 211 has a left shell notch 2111, and the right outer casing 212 has a right shell notch 2121 that matches the left shell notch 2111. When the left outer casing 211 and the right outer casing 212 are fitted together, the left shell notch 2111 and the right shell notch 2121 combine to form a replacement opening 213, i.e., the main casing 21 has a replacement opening 213 for installing and replacing the striking member 40.

The replacement opening 213 is generally rectangular, with a length greater than that of the striking member 40 and a width greater than that of the striking member 40, making it convenient to remove and replace the striking member 40 through the replacement opening 213. One end of the replacement opening 213, away from the striking member 40, has a baffle positioning notch 2131.

The inner surfaces of the left outer casing 211 and the right outer casing 212 also have grid-shaped reinforcement ribs and structures for supporting and fixing internal components such as the motor. The left outer casing 211 and the right outer casing 212 also have multiple cooling and exhaust holes. The specific structure of the left outer casing 211 and the right outer casing 212 is not further detailed as it is known in the art.

The striking member baffle 22 can be detachably mounted on the replacement opening 213. When the striking member baffle 22 is removed, the replacement opening 213 is exposed, and the striking member 40 can be conveniently installed and/or replaced through the replacement opening 213. When the striking member baffle 22 is installed, the main casing 21 and the striking member baffle 22 together form an integral external casing 20 with higher overall structural strength. It also completely encloses the striking member 40, motor, and other internal components within the external casing 20, providing protection for these internal components and also offering protection to the operator during the nailing process.

FIG. 4 is a schematic structural view of a striking member baffle according to one embodiment of the invention.

As shown in FIGS. 2B and 4, the striking member baffle 22 includes a baffle inner side 221 and a baffle outer side 222. When the striking member baffle 22 is installed on the replacement opening 213, the baffle inner side 221 faces the striking member 40. The striking member baffle 22 also includes a baffle latch 223, a pair of baffle installation holes 224, and a pair of baffle supporting wings 225.

The baffle inner side 221 of the baffle has a grid-like reinforcement, which is used to strengthen the structural strength of the striking member baffle 22. In one embodiment, the reinforcement has multiple protrusions, one of which in the middle is the middle protrusion 2211, and its extension direction is consistent with the length direction of the striking member baffle 22.

FIG. 5 is a schematic structural view of a snap-fit structure between a baffle latch and a baffle latch slot according to one embodiment of the invention.

As shown in FIGS. 4-5, the baffle latch 223 locates on the baffle inner side 221 of the baffle. The baffle latch 223 matches the baffle latch slot 2113 of the left outer shell 211. The striking member baffle 22 and the main casing 21 can be latched together by the baffle latch 223 and the baffle latch slot 2113, thereby limiting the movement of the striking member baffle 22 in the nail striking direction.

Specifically, the baffle latch 223 includes a first baffle latch extension 2231 extending roughly vertically downward from the baffle inner side 221 of the baffle and a second baffle latch extension 2232 extending along the length direction of the striking member baffle 22 from the end of the first baffle latch extension 2231. The second baffle latch extension 2232 extends into the baffle latch slot 2113 to make the baffle latch 223 engage with the baffle latch slot 2113. The baffle latch 223 also matches the baffle positioning notch 2131. When installing, the baffle latch 223 can be positioned to a predetermined loading position through the baffle positioning notch 2131, which is the opening of the baffle latch slot 2113. That is, align the baffle latch 223 with the baffle positioning notch 2131 and press it down. Then, push the striking member baffle 22 along the nail striking direction to make the baffle latch 223 engage with the baffle latch slot 2113. To disengage the baffle 22 from the main casing 21, push the striking member baffle 22 along the energy storage direction so as to make the baffle latch 223 disengage from the baffle latch slot 2113.

The baffle outer side 222 of the baffle has multiple non-slip protrusions 2211, which are used to increase friction when pushing the striking member baffle 22 to make the baffle latch 223 latch or disengage. The multiple non-slip protrusions 2211 are arranged in the direction of the reciprocating movement mentioned above and are evenly spaced. The length direction of each non-slip protrusion 2211 is perpendicular to the reciprocating motion direction.

The baffle installation holes 224 are used to install the striking member baffle 22 on the striking member driving assembly 30. Two baffle fasteners 226 pass through the two installation holes 224 and a baffle installation hole 341 on the striking member driving assembly 30, fixing the striking member baffle 22 to the striking member driving assembly 30. The installation holes 224 and the baffle latch 223 respectively locate the two sides of the striking member baffle 22 along its length direction, where the installation holes 224 locate on the side closer to the striking member 40.

The baffle supporting wings 225 are used to support the striking member baffle 22 after it is installed on the main casing 21, preventing the striking member baffle 22 from being jammed into the replacement opening 213 due to force. The pair of baffle supporting wings 225 are located on both sides of the striking member baffle 22 along its width direction and correspond in shape and position to a pair of wing supports (i.e., the left wing support 2112 and the right wing support 2122). After the striking member baffle 22 is installed on the main casing 21, the pair of baffle supporting wings 225 are in contact with the pair of wing supports.

The striking member driving assembly 30 is used to drive the striking member 40 to move along a predetermined reciprocating direction. The striking member driving assembly 30 includes a piston part 31, a spring 32, a muzzle mechanism 33, a regulation frame mechanism 34, a guide rod 35 and nail storage mechanism 36.

The piston part 31 is used to drive the striking member 40 to move along a predetermined reciprocating direction. The piston part 31 has a receiving hole 312 for fixing and installing the striking member 40.

Figure 10B:
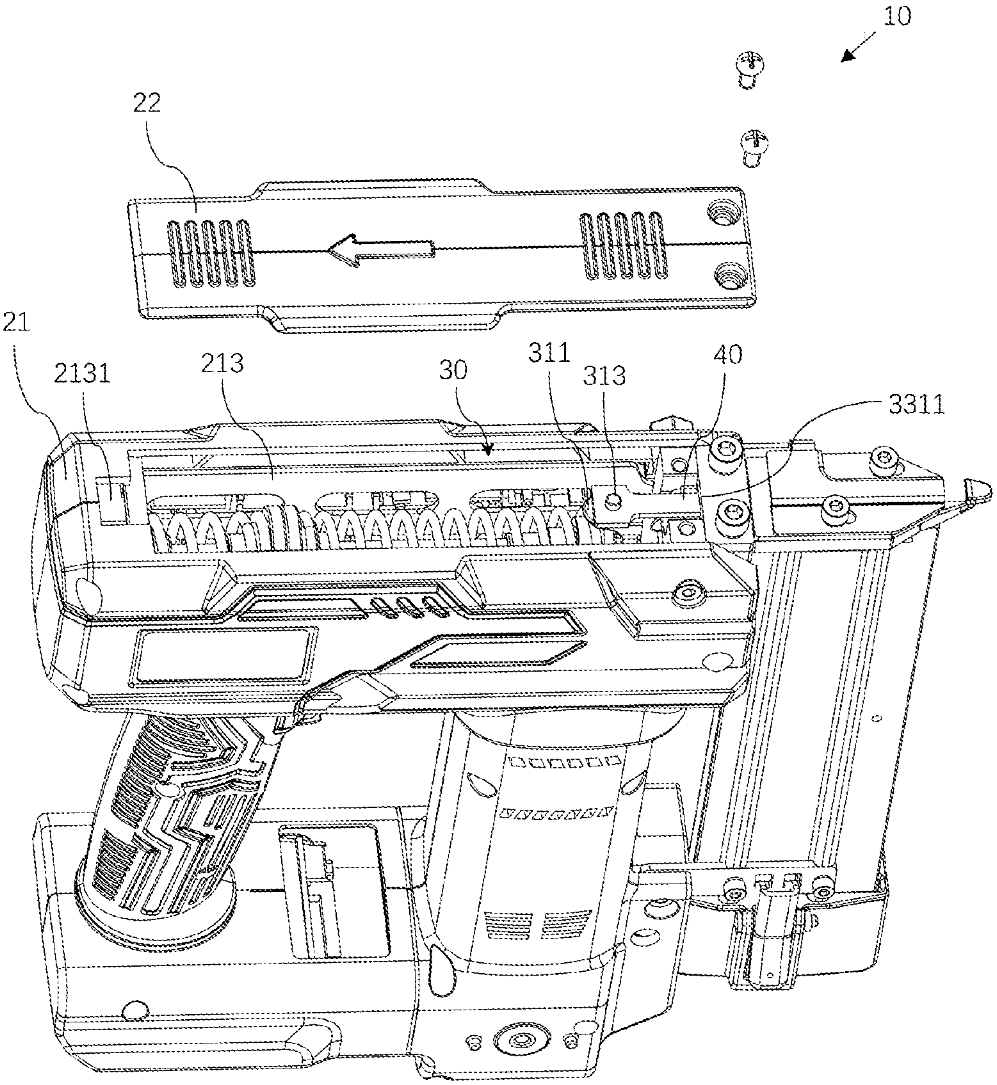
FIG. 10B is a structural exploded view of the nail gun with the striking member according to another embodiment of the invention.

As shown in FIGS. 2B and 10B, the piston part 31 has a striking member connector 311 that extends from its main body toward the striking member baffle 22. After installation, the surface of the striking member connector 311 facing the striking member baffle 22 serves as a support surface. The striking member connector 311 has a connecting post 313 extending from the middle of the support surface toward the striking member baffle 22 for connecting the striking member 40. In one embodiment, the connecting post 313 is cylindrical, and its extension direction is perpendicular to the support surface of the striking member connector 311 and also perpendicular to the aforementioned reciprocating motion direction. In addition, as shown in FIG. 2B, after the striking member baffle 22 is removed, the striking member connector 311 is exposed from the replacement opening 213, allowing the striking member 40 to be replaced through the replacement opening 213.

The spring 32 provides power for the movement of the piston part 31.

The muzzle mechanism 33 is used to accommodate the striking member 40 and to limit the movement of the striking member 40 during the striking of the nails.

FIG. 6 is an exploded view of a muzzle mechanism according to one embodiment of the invention.

As shown in FIGS. 2B and 6, the muzzle mechanism 33 includes a striking member holding piece 331 and a muzzle cover 332.

The striking member holding piece 331 has a groove. When the striking member holding piece 331 and muzzle cover 332 are assembled together, the groove and the surface of the muzzle cover 332 facing the groove form a striking member guiding groove 3312 for accommodating the striking member 40. The striking member guiding groove 3312 has a guiding groove opening 3311 consistent with the direction of the replacement opening 213 for inserting and removing the striking member 40. As shown in FIG. 2B, the projection of the replacement opening 213 on the plane where the guiding groove opening 3311 is located covers the guiding groove opening 3311. That is, the replacement opening 213 exposes the guiding groove opening 3311 completely.

The regulation frame mechanism 34 is used to regulate and limit the movement of piston part 31 during the nailing process and the energy storage process. The regulating frame 33 is rectangular, and both piston part 31 and spring 32 are disposed within the regulating frame 33, with the two parallel regulating side plates of the regulating frame 33 holding the piston part 31. The piston part 31 locates on the side near the nailing mouth, one end of spring 32 abuts piston part 31, and the other end abuts the side of the regulating frame 33 away from the nailing mouth.

The location of the regulating frame 34 near the nailing mouth has the two aforementioned baffle mounting holes 341, which match the aforementioned baffle fasteners 226.

Guide rod 35 works with regulating frame 34 to regulate and limit the movement of piston part 31. One end of the guide rod 35 is fixedly mounted on the piston part 31, the other end connects to the side of the regulating frame 34 away from the nailing mouth, and the extension direction of guide rod 35 is consistent with the predetermined reciprocating direction. Spring 32 is installed on guide rod 35.

Magazine mechanism 36 is sued for storing mails, with multiple nails aligned in the magazine mechanism 36. In addition, the muzzle mechanism 33 and the magazine mechanism 36 are connected together and thus can be installed and/or removed as a whole.

The striking member 40 is used to strike nails.

Figure 7B:
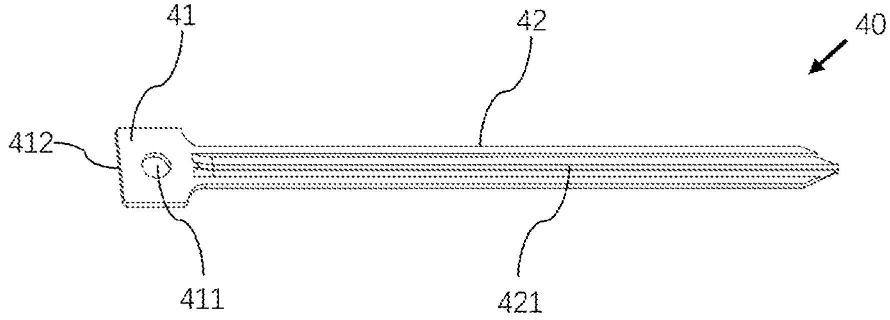
FIG. 7B is a schematic structural view of a striking member according to another embodiment of the invention.

FIG. 7B is a schematic structural view of a striking member according to another embodiment of the invention.

FIG. 10B is a structural exploded view of the nail gun with the striking member of FIG. 7B installed according to another embodiment of the invention.

As shown in FIGS. 2B, 6, 7B and 10B, the striking member 40 includes a striking member tail 41 and a guiding striking part 42.

The striking member tail 41 is used to install the striking member 40 onto the striking member drive assembly 30. In one embodiment, the striking member tail 41 is shaped like a square plate, and in the middle of the striking member tail 41, there is a circular striking member mounting hole 411. The shape of the connecting post 313 on the piston part matches the striking member mounting hole 411. Specifically, the connecting post 313 is cylindrical, its diameter is slightly smaller than the diameter of the striking member mounting hole 411, and in this embodiment, the extension length of the connecting post 313 is slightly greater than the depth of the striking member mounting hole 411.

The guiding striking part 42 is used for striking nails. The guiding striking part 42 is integrally formed with the striking member tail 41 and is shaped like a long strip plate, connecting to the middle of one side of the striking member tail 41. The connection location between the striking member tail 41 and the guiding striking part 42 is arc-shaped.

One side of the guiding striking part 42 has a guiding recess 421, which is used to regulate the movement direction of the striking member 40 during the nailing process. The aforementioned striking member guiding groove 3312 also has a groove structure that matches the guiding recess 421, so the guiding striking part 42 can be inserted into the striking member guiding groove 3312 from the guiding groove opening 3311 and can slidably fit into the striking member guiding groove 3312.

When the striking member 40 is installed on the piston part 31, the connecting post 313 passes through and fits into the striking member mounting hole 411, and the plate-shaped striking member tail 41 is in contact with the connecting post 313 on the piston part 31. The guiding striking part 42 can slidably fit into the striking member guiding groove 3312.

Therefore, after the striking member baffle 22 is removed, the replacement opening 213 is exposed, and the striking member tail 41 of the striking member 40 and the corresponding striking member fastener are exposed from the replacement opening 213, making it easy to disassemble the striking member 40 that needs to be replaced. After the striking member 40 to be replaced has been disassembled, the guiding groove opening 3311 is exposed from the replacement opening 213, and it is now easy to install a new striking member 40 by inserting it into the striking member guiding groove 3312 through the guiding groove opening 3311.

Figure 9B:
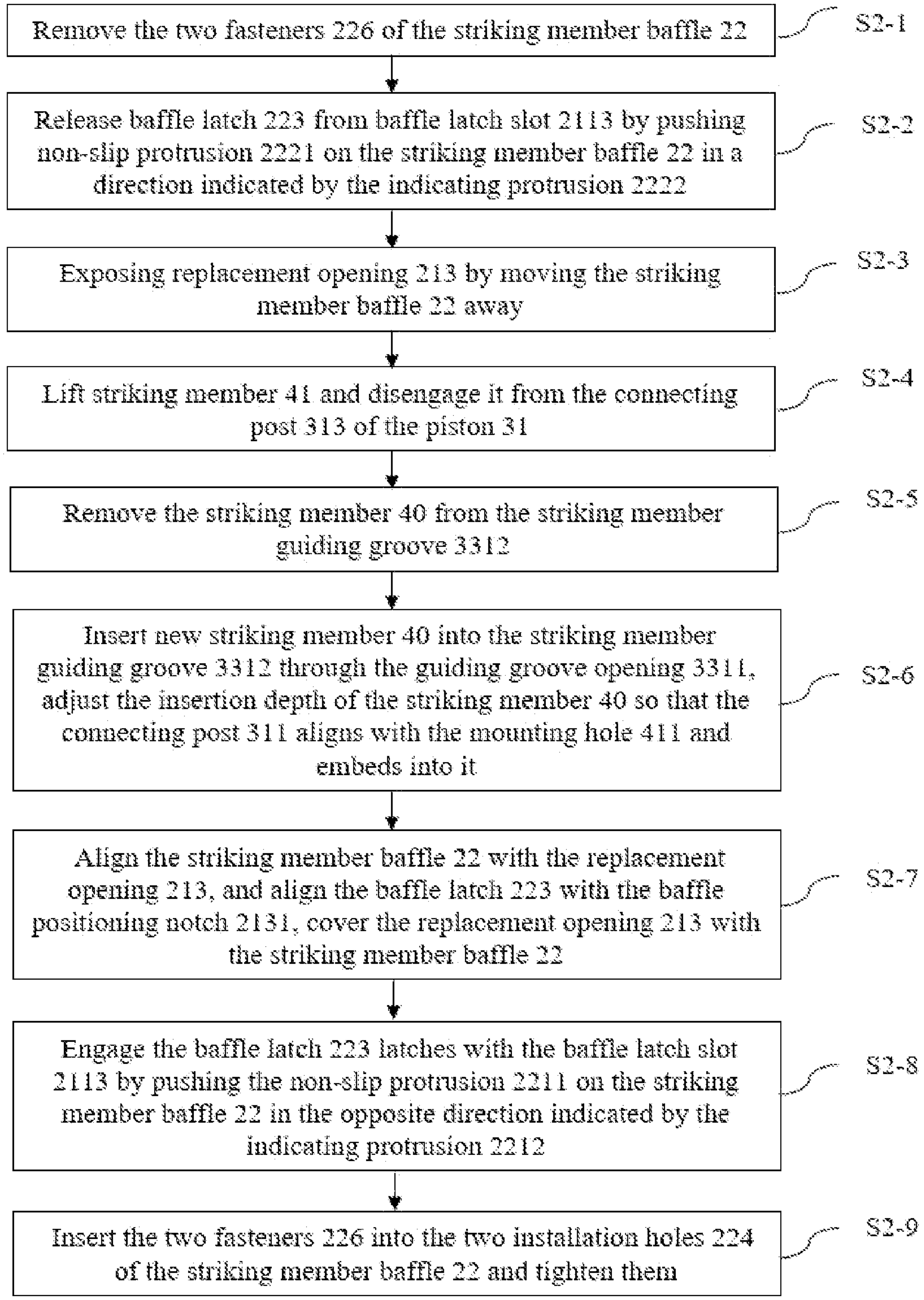
FIG. 9B is a flowchart of the striking member replacement process according to another embodiment of the invention.

FIG. 9B is a flowchart of the striking member replacement process according to one embodiment of the invention.

As shown in FIG. 9B, based on the nail gun 10 and the striking member installation mechanism 12 according to one embodiment of the invention, the process of replacing the striking member 40 in the nail gun 10 includes the following steps.

Step S2-1: Use a screwdriver to remove the two fasteners 226 of the striking member baffle 22, then proceed to step S2-2.

Step S2-2: Hold the non-slip protrusion 2221 on the striking member baffle 22 and push it in the direction indicated by the indicating protrusion 2222, so that the baffle latch 223 is released from the baffle latch slot 2113, then proceed to step S2-3.

Step S2-3: Move the striking member baffle 22 away, exposing the replacement opening 213, then proceed to step S2-4.

Step S2-4: Lift the striking member tail 41 of the striking member 40 to be replaced so that the striking member mounting hole 411 is disengaged from the connecting post 313 of the piston part 31, then proceed to step S2-5.

Step S2-5: Remove the striking member 40 to be replaced from the striking member guiding groove 3312, then proceed to step S2-6.

Step S2-6: Insert the new striking member 40 into the striking member guiding groove 3312 through the guiding groove opening 3311, adjust the insertion depth of the striking member 40 so that the mounting hole 411 of the striking member 40 aligns with the connecting post 313 of the piston part 31 and embeds into it, then proceed to step S2-7.

Step S2-7 Align the striking member baffle 22 with the replacement opening 213, and align the baffle latch 223 with the baffle positioning notch 2131, cover the replacement opening 213 with the striking member baffle 22, then proceed to step S2-8.

Step S2-8: Hold the non-slip protrusion 2211 on the striking member baffle 22 and push it in the opposite direction indicated by the indicating protrusion 2212, so that the baffle latch 223 latches into the baffle latch slot 2113, then proceed to step S2-9.

Step S2-9: Insert the two fasteners 226 into the two installation holes 224 of the striking member baffle 22 and tighten them with a screwdriver, then proceed to the end state.

As described above, the striking member installation mechanism 12 and the nail gun 10 of this embodiment can quickly and easily replace the striking member 40 by disassembling the striking member baffle 22 and accessing the replacement opening 213, and can equally easily reinstall the striking member baffle 22, allowing the nail gun 10 to quickly return to a working state.

Effect of Embodiment 2-1

The nail gun provided in this embodiment, which facilitates quick and easy replacement of striking members, has a removable striking member baffle mounted on a replacement opening in the outer casing, which corresponds to the tail end of the striking member. Therefore, the striking member baffle can be removed, and the striking member can be replaced through the replacement opening without having to open the entire casing, remove and reinstall many internal components. Because the striking member tail has a mounting hole and the piston part has a connecting post that matches the striking member mounting hole, the striking member's mounting hole can be embedded and fixed to the connecting post of the piston part, connecting the two without the need for pins, screws, or other connectors. This reduces the number of parts and avoids the loss of smaller parts, as well as simplifying installation steps, making it easier for ordinary users to replace the striking member.

Specifically, the striking member tail has a circular mounting hole. The piston part has a striking member connector directed towards the removable striking member baffle, with its upper surface facing the striking member baffle serving as a support surface. On the support surface, there is a connecting post extending towards the striking member baffle. The connecting post is a cylinder that matches the circular mounting hole of the striking member and its extension direction is perpendicular to the reciprocating movement direction. Therefore, after removing the striking member baffle, the striking member can be replaced from the replacement opening of the main casing. During the replacement, it is only necessary to lift out the striking member tail to be replaced, so that it is separated from the connecting post, and then install a new striking member so that the mounting hole of its striking member tail is fitted with the connecting post of the piston part, completing the connection between the two, without needing to use pins or screws to connect the striking member and piston part. In addition, the connecting post is integrally formed with the other parts of the piston part, so it does not add any additional manufacturing steps.

Embodiment 2-2

Figure 12:
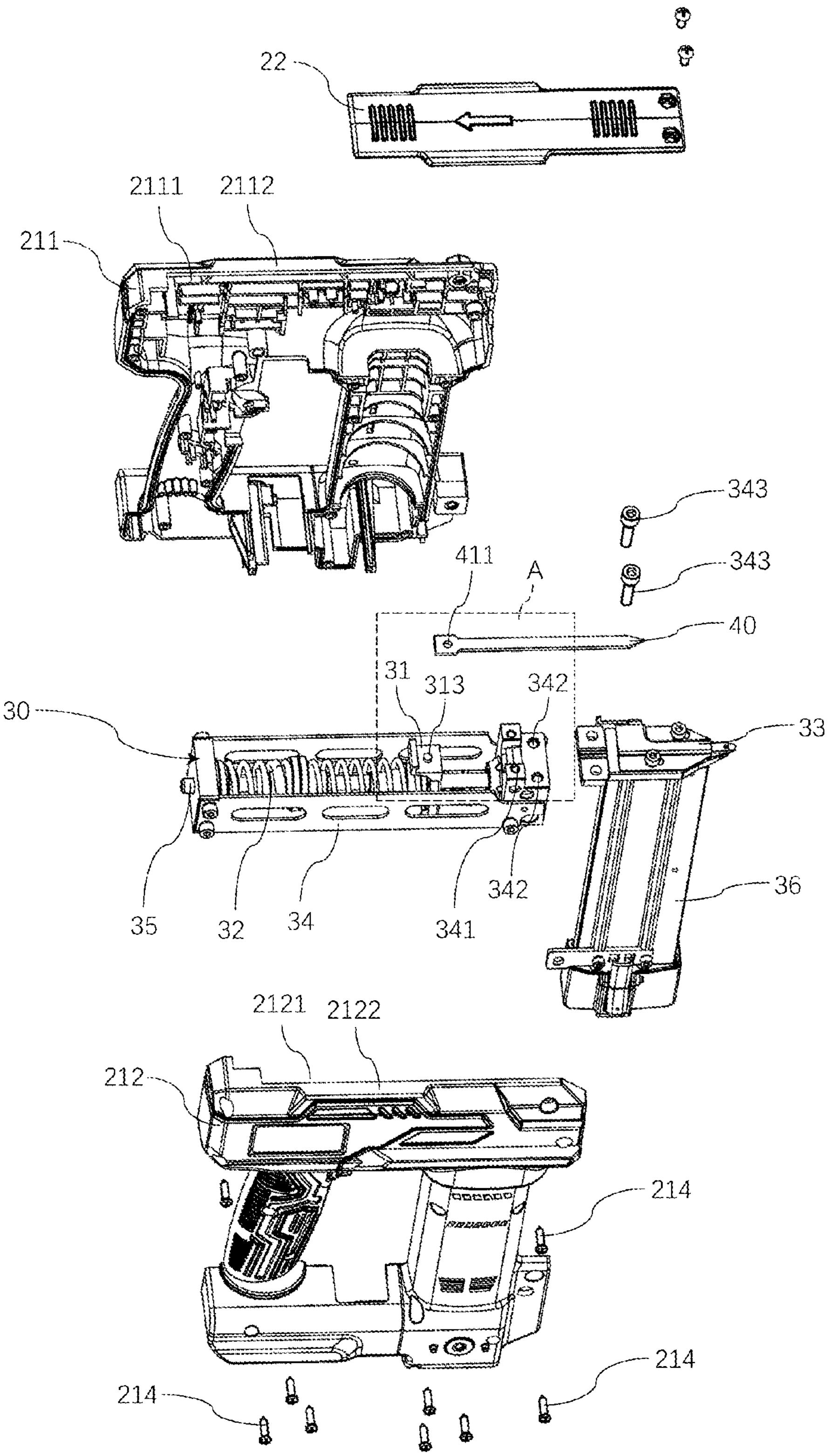
FIG. 12 is an exploded view of the nail gun according to yet another embodiment of the invention.

FIG. 12 is an exploded view of the nail gun according to yet another embodiment of the invention.

Figure 13:
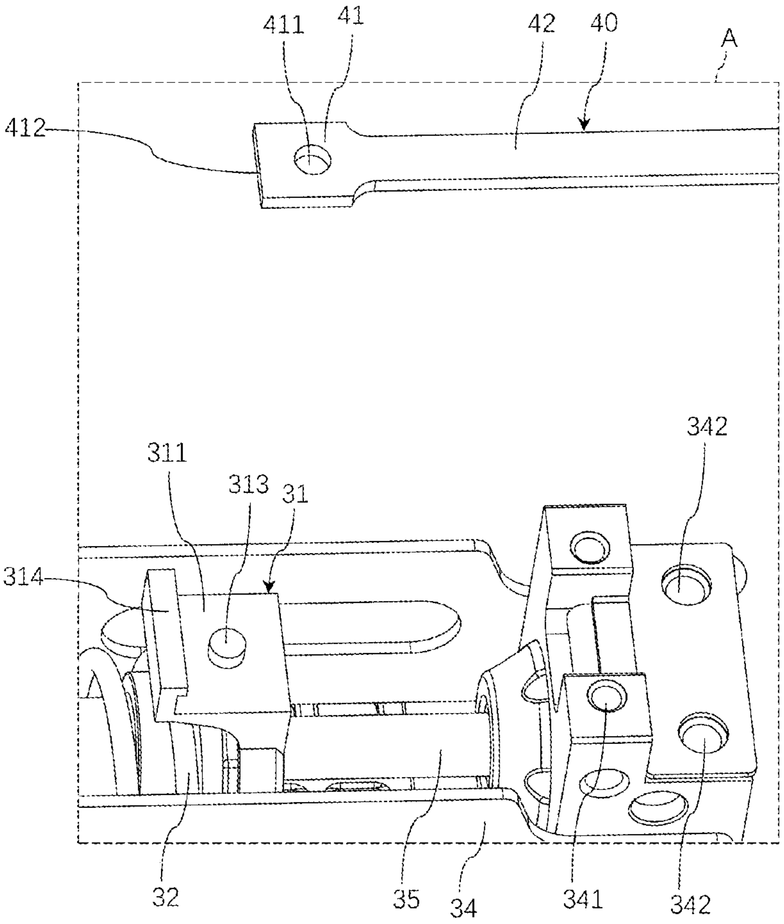
FIG. 13 is an enlarged view of the part A of FIG. 12.

FIG. 13 is an enlarged view of the part A of FIG. 12.

Figure 14:
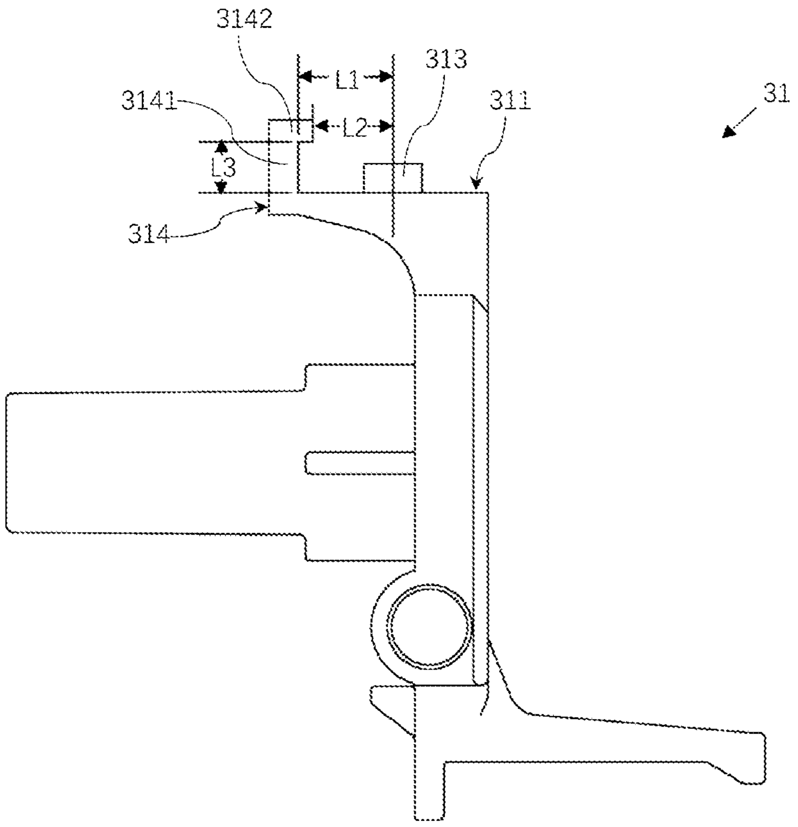
FIG. 14 is a cross section view of a piston part according to one embodiment of present invention.

FIG. 14 is a cross section view of a piston part according to one embodiment of present invention.

As shown in FIGS. 13-14, compared with Embodiment 2-1, the piston part 31 of this embodiment further has a striking member positioning rim 314 for limiting the tail of the striking member 40. The striking member positioning rim 314 extends integrally from the striking member connector 311 towards the striking member baffle 22. Specifically, the striking member positioning rim 314 is hook-shaped, including a first extending rim section 3141 and a second extending rim section 3142, where the first extending rim section 3141 extends vertically upward from the side edge of the striking member connector 311 that is away from the gun muzzle 33, i.e., the extending direction is perpendicular to the supporting surface, and both the extending direction and width direction are perpendicular to the reciprocating motion direction; the second extending rim section 3142 extends from the end of the first extending rim section 3141 towards the gun muzzle 33 direction, the extending direction is perpendicular to the first extending rim section 3141 and parallel to the reciprocating motion direction, the width direction is perpendicular to the reciprocating motion direction, thereby forming a hook shape, which can hook the tail of the striking member 41.

Furthermore, as shown in FIGS. 13-14, on the regulation frame 34, in front of the baffle mounting hole 341 (closer to the muzzle mechanism 33 position), there are also a pair of magazine connecting holes 342, and the muzzle mechanism 33 and magazine 36 are mounted at the magazine mechanism connecting holes 342 with connectors 343 (screws), and the muzzle mechanism 33 and magazine mechanism 36 can be disassembled and assembled as a whole.

Figure 15:
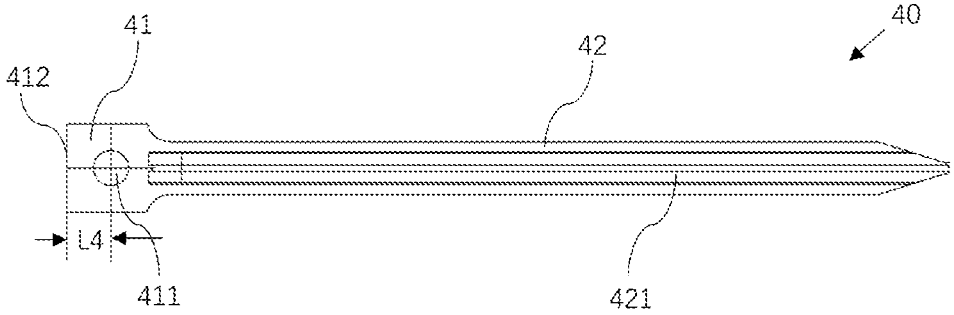
FIG. 15 is a top view of the striking member according to one embodiment of the invention.

FIG. 15 is a top view of the striking member according to one embodiment of the invention.

Figure 16:
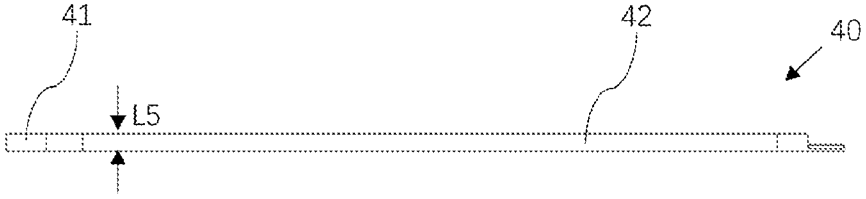
FIG. 16 is a side view of the striking member according to the embodiment of FIG. 15.

FIG. 16 is a side view of the striking member according to the embodiment of FIG. 15.

As shown in FIGS. 14-16, the distance between the second extending rim section 3142 and the striking member connector 311 is greater than the thickness of the striking member 40, i.e., L3>L5 in the figures; the distance between the first extending rim section 3141 and the connecting post 313 is greater than the distance from one end of the striking member 40 to the mounting hole 411, and since the diameter of the connecting post 313 and the diameter of the mounting hole 411 are basically the same, this is equivalent to L1>L4 in the figure. Along the reciprocating motion direction, the distance between the end of the second extending rim section 3142 and the connecting post 313 is less than the distance from one end of the striking member 40 to the mounting hole 411, which is equivalent to L2<L4 in the figure.

Figure 17:
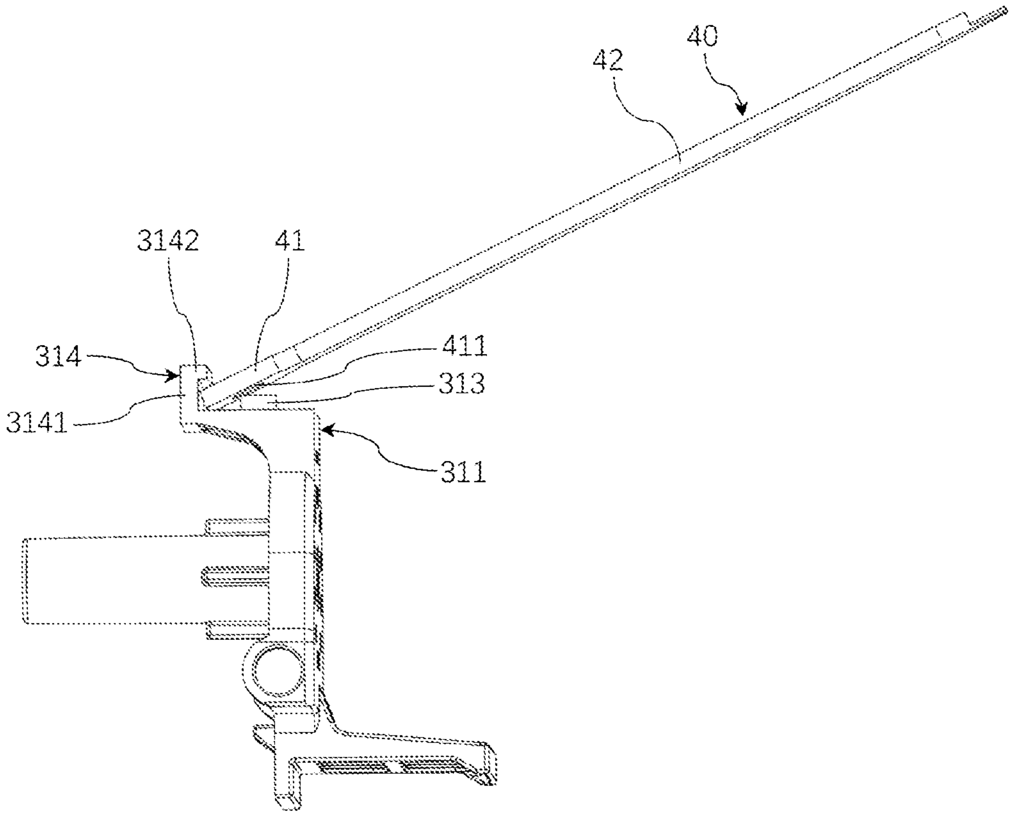
FIG. 17 is a schematic structural view of the striking member diagonally inserted into the piston part according to one embodiment of the invention.

FIG. 17 is a schematic structural view of the striking member diagonally inserted into the piston part according to one embodiment of the invention.

Figure 18:
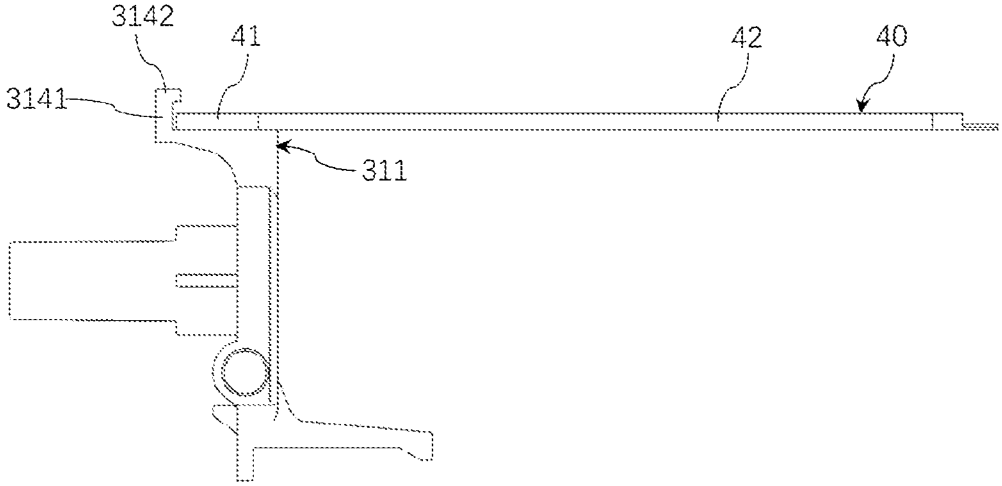
FIG. 18 is a cross section view of the striking member fully inserted into the piston part according to one embodiment of the invention.

FIG. 18 is a cross section view of the striking member fully inserted into the piston part according to one embodiment of the invention.

As shown in FIGS. 17-18, due to the aforementioned structure and size settings, during installation, the striking member tail 41 of the striking member 40 can be obliquely inserted into the hook-shaped striking member positioning rim 314, i.e., the striking member 40 is inclined along its length direction, then the striking member 40 is laid flat downward, so that the connecting post 313 is embedded in the mounting hole 411; or the striking member 40 can be tilted in from the side, and the striking member 40 is inclined along its width direction, then the striking member 40 is rotated to lay flat, so that the connecting post 313 is embedded in the mounting hole 411, completing the connection between the striking member 40 and the piston part 31.

In addition, because of the striking member positioning rim 314, to avoid the striking member 40 from being bent too much during installation, which affects its impact strength and stability when striking nails, it is best to first disassemble the muzzle mechanism 33 and the magazine mechanism 36 as a whole during installation, connect the striking member 40 and the piston part 31 in the above manner, and then install the muzzle mechanism 33 and the magazine mechanism 36 as a whole, making the guiding striking part 42 of the striking member 40 embedded in the striking member guiding groove 3312 of the muzzle mechanism 33.

The structure of the striking member 40 is the same as in Embodiment 2-1.

Figure 19:
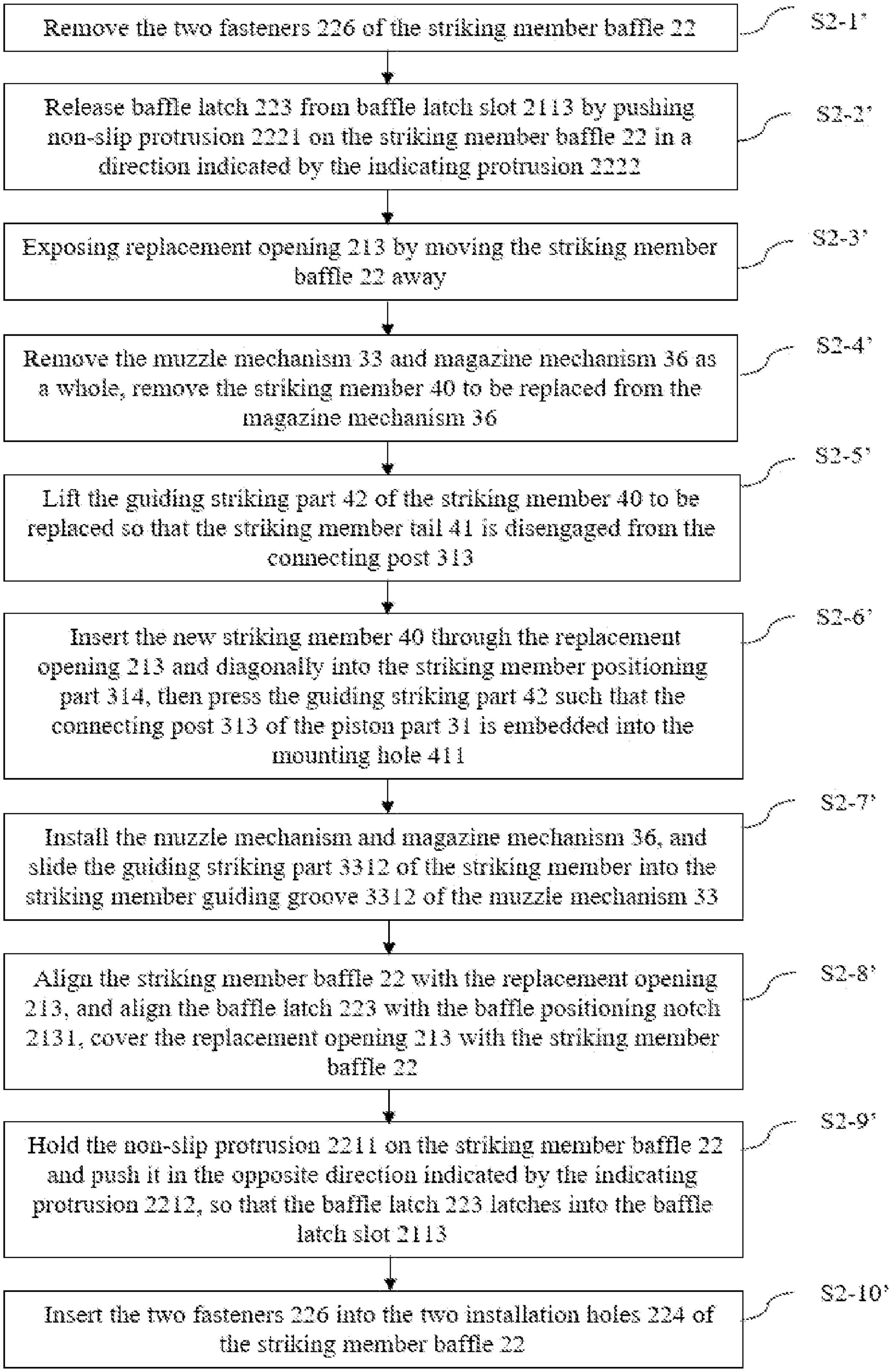
FIG. 19 is a flowchart of the process of replacing the striking member according to another embodiment of the invention.

FIG. 19 is a flowchart of the process of replacing the striking member according to another embodiment of the invention.

As shown in FIG. 19, based on the nail gun 10 and the striking member installation mechanism 12 according to one embodiment of the invention, the process of replacing the striking member 40 in the nail gun 10 includes the following steps.

Step S2-1': Use a screwdriver to remove the two fasteners 226 of the striking member baffle 22, then proceed to step S2-2'.

Step S2-2': Hold the non-slip protrusion 2221 on the striking member baffle 22 and push it in the direction indicated by the indicating protrusion 2222, so that the baffle latch 223 is released from the baffle latch slot 2113, then proceed to step S2-3'.

Step S2-3': Move the striking member baffle 22 away, exposing the replacement opening 213, then proceed to step S2-4'.

Step S2-4': Remove the muzzle mechanism 33 and magazine mechanism 36 as a whole, remove the striking member 40 to be replaced from the magazine mechanism 36, then proceed to step S2-5'.

Step S2-5': Lift the guiding striking part 42 of the striking member 40 to be replaced so that the striking member tail 41 is disengaged from the connecting post 313 of the piston part 31, then proceed to step S2-6'.

Step S2-6': Insert the new striking member 40 through the replacement opening 213 and diagonally into the striking member positioning part 314, then press the guiding striking part 42 such that the connecting post 313 of the piston part 31 is embedded into the mounting hole 411 of the striking member tail 41, then proceed to S2-7'.

Step 2-7': Install the muzzle mechanism and magazine mechanism 36, and slide the guiding striking part 3312 of the striking member into the striking member guiding groove 3312 of the muzzle mechanism 33, then proceed to Step 2-8'.

Step S2-8': Align the striking member baffle 22 with the replacement opening 213, and align the baffle latch 223 with the baffle positioning notch 2131, cover the replacement opening 213 with the striking member baffle 22, then proceed to step S2-9'.

Step S2-9': Hold the non-slip protrusion 2211 on the striking member baffle 22 and push it in the opposite direction indicated by the indicating protrusion 2212, so that the baffle latch 223 latches into the baffle latch slot 2113, then proceed to step S2-10'.

Step S2-10': Insert the two fasteners 226 into the two installation holes 224 of the striking member baffle 22 and tighten them with a screwdriver, then proceed to the end state.

Effect and Function of Embodiment 2-2

In one embodiment, the striking member installation mechanism includes a removable striking member baffle, the striking member's mounting hole, and connecting post of the piston part 313 matching the mounting holes. Thus the present invention enables rapid and easy replacement and installation of the striking member.

Furthermore, in one embodiment, the piston in this embodiment has a hook-shaped striking member positioning rim, including a first extension rim section extending perpendicular to the support surface, and a second extension rim section further extending from the end of the first extension rim section. The extension direction and width direction of the first extension rim section are both perpendicular to the reciprocating motion direction, so during the movement of the piston, the striking member positioning rim can limit the striking member tail, further regulating the movement of the striking member tail, avoiding deflection, etc., thereby further enhancing the stability of the nail striking. In addition, during the nail striking process, the striking member positioning rim can directly apply force to one end of the striking member in the length direction. Compared with the method of applying force to the striking member through the connecting post in the Embodiment 2-1, this method can also enhance the force and stability of nail striking, or reduce the structural strength requirements of the striking member under the same nail striking force.

In the above embodiments, the extension length of the connecting post 313 is slightly greater than the depth of the mounting hole 411 of the striking member 40. In alternative schemes, the extension length of the connecting post 313 can also be equal to or slightly less than the depth of the mounting hole 411, which does not affect the connection between the piston part 31 and the striking member 40, and can also achieve the corresponding technical effects.

Embodiment 3

In one embodiment, the striking member is in a plate shape and has a plate-like mounting tail with an increased width near the piston and a guiding striking part for striking nails. The piston part has a striking member receiving slot that matches the mounting tail, and the mounting tail is embedded in the striking member receiving slot.

In one embodiment, the reciprocating direction includes the direction in which the nail is struck out, and the side of the mounting tail that is away from the guiding striking part is perpendicular to the reciprocating direction. This side is the first force-receiving surface. The side wall of the striking member receiving slot that contacts the first force-receiving surface is perpendicular to the bottom wall of the striking member receiving slot. When the piston moves in the striking direction, the first force-receiving surface is in contact with the side wall of the striking member receiving slot.

In one embodiment, the guiding striking part is a strip-shaped plate, and the striking member receiving slot has a square groove portion that matches the mounting tail and a strip groove portion that matches the guiding striking part. One end of the strip groove portion is connected to the square groove portion, and the other end is connected to the outside. The mounting tail is embedded in the square groove portion, and one end of the guiding striking part is embedded in the strip groove portion.

In one embodiment, the reciprocating direction also includes the spring energy storage direction opposite to the nail striking direction. The mounting tail and the guiding striking part have a pair of second force-receiving surfaces on both sides of the connection. The square groove and the strip groove have a pair of limiting steps at the junction. When the piston moves in the spring energy storage direction, the pair of limiting steps are in contact with the pair of second force-receiving surfaces.

In one embodiment, the striking member has a guiding striking part for striking nails. The striking member driving assembly has a striking member guiding groove that matches the guiding striking part. The striking member guiding groove has an opening for accommodating the striking member. The replacement opening projection on the plane where the guiding groove opening is located covers the housing groove opening.

In one embodiment, the direction of the guiding groove opening is consistent with the length direction of the replacement opening. The length of the replacement opening is greater than the length of the striking member, and the width of the replacement opening is greater than the width of the striking member.

FIG. 1 is a schematic structural view of the nail gun according to one embodiment of the invention.

Figure 2C:
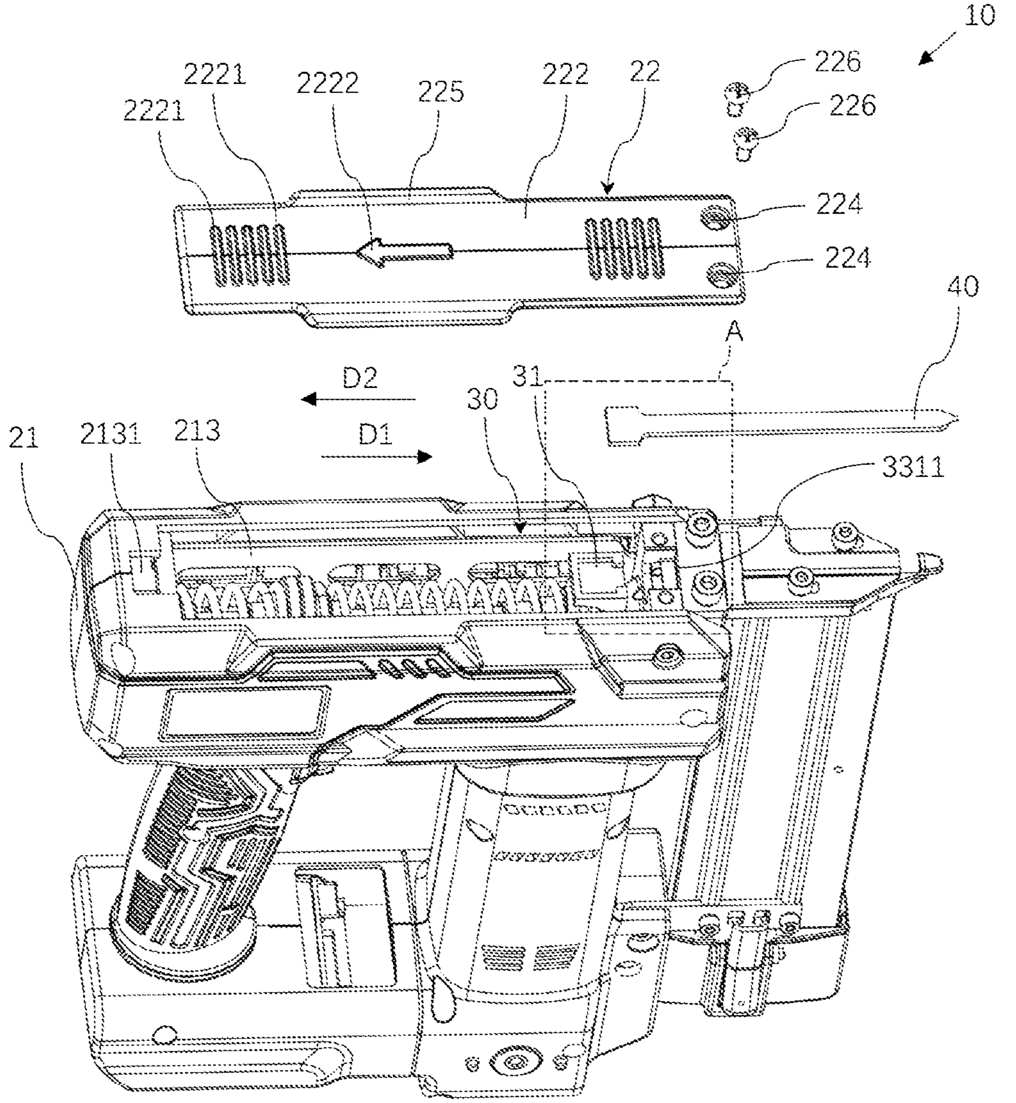
FIG. 2C is a partial exploded view of the nail gun with striking member baffle detached according to yet another embodiment of the invention.

FIG. 2C is a partial exploded view of the nail gun with the striking member baffle detached according to one embodiment of the invention.

Figure 3C:
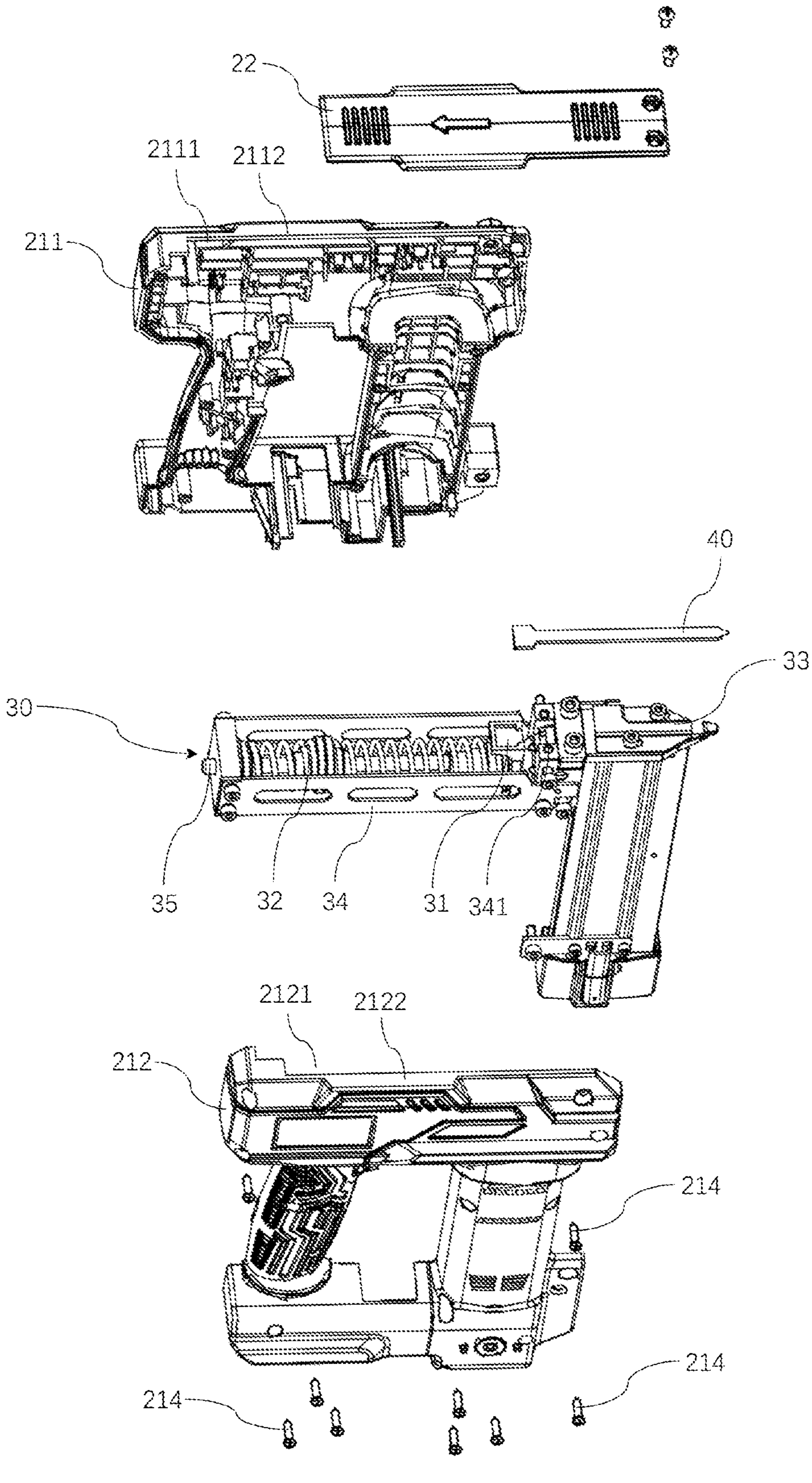
FIG. 3C is an exploded view of the nail gun according to yet another embodiment of the invention.

FIG. 3C is an exploded view of the nail gun according to one embodiment of the invention.

As shown in FIGS. 1-3, the nail gun 10 according to one embodiment of the invention includes a striking member rapid installation mechanism 12 and a striking member 40. The nail gun 10 also includes conventional internal components such as a motor and battery (not shown in the figure) disposed inside the casing 20, which will not be described in detail here as they are known in the art.

The striking member installation mechanism 12 is used for quickly installing and replacing the striking member 40 mounted inside the nail gun 10. The striking member installation mechanism 12 includes an external casing 20 and a striking member drive assembly 30 disposed inside the casing 20. In one embodiment, the striking member 40 moves in a predetermined reciprocating motion direction driven by the striking member drive assembly 30, as indicated by arrow D1 in FIG. 2C, which represents the nail striking direction, and arrow D2 indicates the spring energy storage direction opposite to the nail striking direction. The reciprocating motion direction includes both the nail striking direction and the spring energy storage direction.

The casing 20 includes a main casing 21 and a striking member baffle 22.

The main casing 21 is used to accommodate the aforementioned striking member drive assembly 30, striking member 40, motor, battery, and other internal components, and provides protection for these internal components. The main casing 21 includes a left outer casing 211, a right outer casing 212, and multiple casing fasteners 214. In this embodiment, the terms "left," "right," "top," and "bottom" are relative to the operator's perspective when holding the nail gun to shoot nails.

The left outer casing 211 and the right outer casing 212 can be fitted together to form an integral main casing 21 and can be fastened by multiple casing fasteners 214. In this embodiment, the casing fasteners 214 are rivets that match the casing installation holes on the left outer casing 211 and the right outer casing 212.

The top of the left outer casing 211 has a left shell notch 2111, and the right outer casing 212 has a right shell notch 2121 that matches the left shell notch 2111. When the left outer casing 211 and the right outer casing 212 are fitted together, the left shell notch 2111 and the right shell notch 2121 combine to form a replacement opening 213, i.e., the main casing 21 has a replacement opening 213 for installing and replacing the striking member 40.

The replacement opening 213 is generally rectangular, with a length greater than that of the striking member 40 and a width greater than that of the striking member 40, making it convenient to remove and replace the striking member 40 through the replacement opening 213. One end of the replacement opening 213, away from the striking member 40, has a baffle positioning notch 2131.

The inner surfaces of the left outer casing 211 and the right outer casing 212 also have grid-shaped reinforcement ribs and structures for supporting and fixing internal components such as the motor. The left outer casing 211 and the right outer casing 212 also have multiple cooling and exhaust holes. The specific structure of the left outer casing 211 and the right outer casing 212 is not further detailed as it is known in the art.

The striking member baffle 22 can be detachably mounted on the replacement opening 213. When the striking member baffle 22 is removed, the replacement opening 213 is exposed, and the striking member 40 can be conveniently installed and/or replaced through the replacement opening 213. When the striking member baffle 22 is installed, the main casing 21 and the striking member baffle 22 together form an integral external casing 20 with higher overall structural strength. It also completely encloses the striking member 40, motor, and other internal components within the external casing 20, providing protection for these internal components and also offering protection to the operator during the nailing process.

FIG. 4 is a schematic structural view of a striking member baffle according to one embodiment of the invention.

As shown in FIGS. 2C and 4, the striking member baffle 22 includes a baffle inner side 221 and a baffle outer side 222. When the striking member baffle 22 is installed on the replacement opening 213, the baffle inner side 221 faces the striking member 40. The striking member baffle 22 also includes a baffle latch 223, a pair of baffle installation holes 224, and a pair of baffle supporting wings 225.

The baffle inner side 221 of the baffle has a grid-like reinforcement, which is used to strengthen the structural strength of the striking member baffle 22. In one embodiment, the reinforcement has multiple protrusions, one of which in the middle is the middle protrusion 2211, and its extension direction is consistent with the length direction of the striking member baffle 22.

FIG. 5 is a schematic structural view of a snap-fit structure between a baffle latch and a baffle latch slot according to one embodiment of the invention.

As shown in FIGS. 4-5, the baffle latch 223 locates on the baffle inner side 221 of the baffle. The baffle latch 223 matches the baffle latch slot 2113 of the left outer shell 211. The striking member baffle 22 and the main casing 21 can be latched together by the baffle latch 223 and the baffle latch slot 2113, thereby limiting the movement of the striking member baffle 22 in the nail striking direction.

Specifically, the baffle latch 223 includes a first baffle latch extension 2231 extending roughly vertically downward from the baffle inner side 221 of the baffle and a second baffle latch extension 2232 extending along the length direction of the striking member baffle 22 from the end of the first baffle latch extension 2231. The second baffle latch extension 2232 extends into the baffle latch slot 2113 to make the baffle latch 223 engage with the baffle latch slot 2113. The baffle latch 223 also matches the baffle positioning notch 2131. When installing, the baffle latch 223 can be positioned to a predetermined loading position through the baffle positioning notch 2131, which is the opening of the baffle latch slot 2113. That is, align the baffle latch 223 with the baffle positioning notch 2131 and press it down. Then, push the striking member baffle 22 along the nail striking direction to make the baffle latch 223 engage with the baffle latch slot 2113. To disengage the baffle 22 from the main casing 21, push the striking member baffle 22 along the energy storage direction so as to make the baffle latch 223 disengage from the baffle latch slot 2113.

The baffle outer side 222 of the baffle has multiple non-slip protrusions 2211, which are used to increase friction when pushing the striking member baffle 22 to make the baffle latch 223 latch or disengage. The multiple non-slip protrusions 2211 are arranged in the direction of the reciprocating movement mentioned above and are evenly spaced. The length direction of each non-slip protrusion 2211 is perpendicular to the reciprocating motion direction.

The baffle installation holes 224 are used to install the striking member baffle 22 on the striking member driving assembly 30. Two baffle fasteners 226 pass through the two installation holes 224 and a baffle installation hole 341 on the striking member driving assembly 30, fixing the striking member baffle 22 to the striking member driving assembly 30. The installation holes 224 and the baffle latch 223 respectively locate the two sides of the striking member baffle 22 along its length direction, where the installation holes 224 locate on the side closer to the striking member 40.

The baffle supporting wings 225 are used to support the striking member baffle 22 after it is installed on the main casing 21, preventing the striking member baffle 22 from being jammed into the replacement opening 213 due to force. The pair of baffles supporting wings 225 are located on both sides of the striking member baffle 22 along its width direction and correspond in shape and position to a pair of wing supports (i.e., the left wing support 2112 and the right wing support 2122). After the striking member baffle 22 is installed on the main casing 21, the pair of baffles supporting wings 225 are in contact with the pair of wing supports.

The striking member driving assembly 30 is used to drive the striking member 40 to move along a predetermined reciprocating direction. The striking member driving assembly 30 includes a piston part 31, a spring 32, a muzzle mechanism 33, a regulation frame mechanism 34, a guide rod 35 and nail storage mechanism 36.

The piston part 31 is used to drive the striking member 40 to move along a predetermined reciprocating direction. The piston part 31 has a striking member receiving slot 312' for fixing and installing the striking member 40.

Figure 8B:
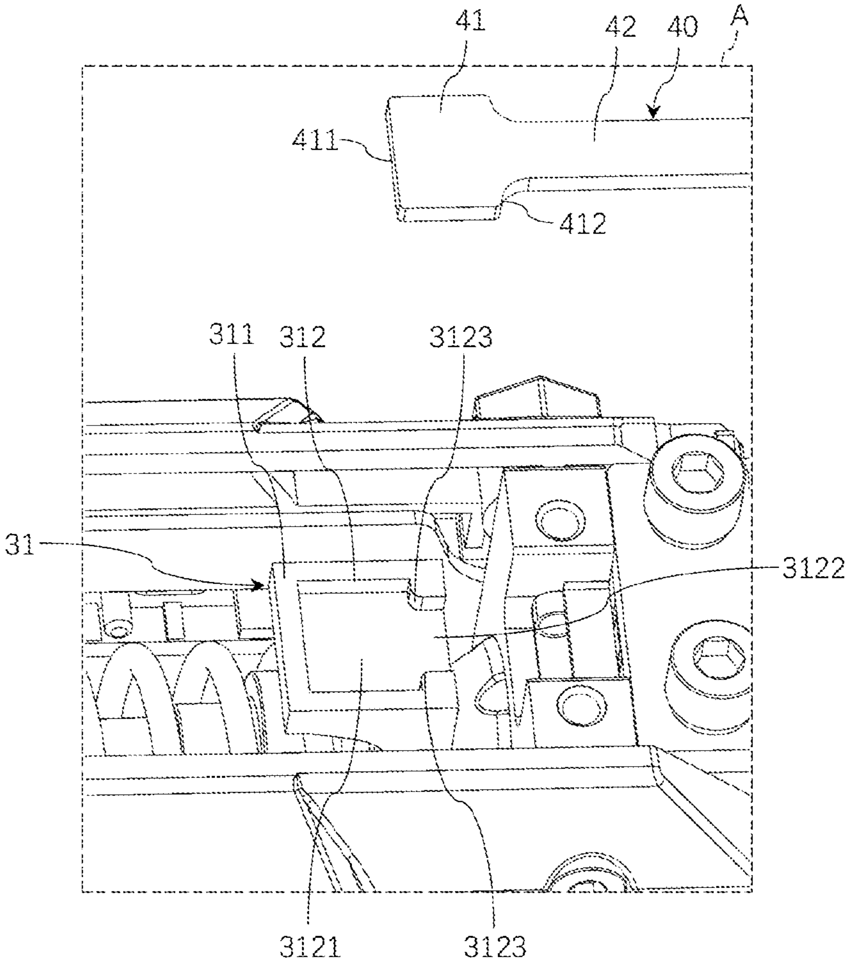
FIG. 8B is an enlarged view of part A in FIG. 3C.

FIG. 8B is an enlarged view of part A of FIG. 2C.

As shown in FIGS. 2C and 8B, the piston part 31 has a striking member connector 311' extending upward from its main body part perpendicular to the reciprocating motion direction, and a striking member receiving slot 312' is provided on the striking member connector 311. The striking member receiving slot 312' includes a square groove portion 3121 and a strip groove portion 3122. The width of the strip groove portion 3122 is smaller than that of the square groove portion 3121. One end of the strip groove portion 3122 is connected to the square groove portion 3121, and the other end is open to the outside. At the connection position between the strip groove portion 3122 and the square groove portion 3121, a pair of limit steps 3123 are formed, and the connection position has a chamfer. Therefore, the overall shape of the striking member receiving slot 312' matches the mounting tail 41 of the striking member, and the mounting tail 41 can be embedded and fixed in the striking member receiving slot 312'.

The spring 32 provides power for the movement of the piston part 31.

The muzzle mechanism 33 is used to accommodate the striking member 40 and to limit the movement of the striking member 40 during the striking of the nails.

FIG. 6 is an exploded view of a muzzle mechanism according to one embodiment of the invention.

As shown in FIGS. 2C and 6, the muzzle mechanism 33 includes a striking member holding piece 331 and a muzzle cover 332.

The striking member holding piece 331 has a groove. When the striking member holding piece 331 and muzzle cover 332 are assembled together, the groove and the surface of the muzzle cover 332 facing the groove form a striking member guiding groove 3312 for accommodating the striking member 40. The striking member guiding groove 3312 has a guiding groove opening 3311 consistent with the direction of the replacement opening 213 for inserting and removing the striking member 40. As shown in FIG. 2B, the projection of the replacement opening 213 on the plane where the guiding groove opening 3311 is located covers the guiding groove opening 3311. That is, the replacement opening 213 exposes the guiding groove opening 3311 completely.

The regulation frame mechanism 34 is used to regulate and limit the movement of piston part 31 during the nailing process and the energy storage process. The regulating frame 33 is rectangular, and both piston part 31 and spring 32 are disposed within the regulating frame 33, with the two parallel regulating side plates of the regulating frame 33 holding the piston part 31. The piston part 31 locates on the side near the nailing mouth, one end of spring 32 abuts piston part 31, and the other end abuts the side of the regulating frame 33 away from the nailing mouth.

The location of the regulating frame 34 near the nailing mouth has the two aforementioned baffle mounting holes 341, which match the aforementioned baffle fasteners 226.

Guide rod 35 works with regulating frame 34 to regulate and limit the movement of piston part 31. One end of the guide rod 35 is fixedly mounted on the piston part 31, the other end connects to the side of the regulating frame 34 away from the nailing mouth, and the extension direction of guide rod 35 is consistent with the predetermined reciprocating direction. Spring 32 is installed on guide rod 35.

Magazine mechanism 36 is sued for storing mails, with multiple nails aligned in the magazine mechanism 36. In addition, the muzzle mechanism 33 and the magazine mechanism 36 are connected together and thus can be installed and/or removed as a whole.

The striking member 40 is used to strike nails.

Figure 7C:
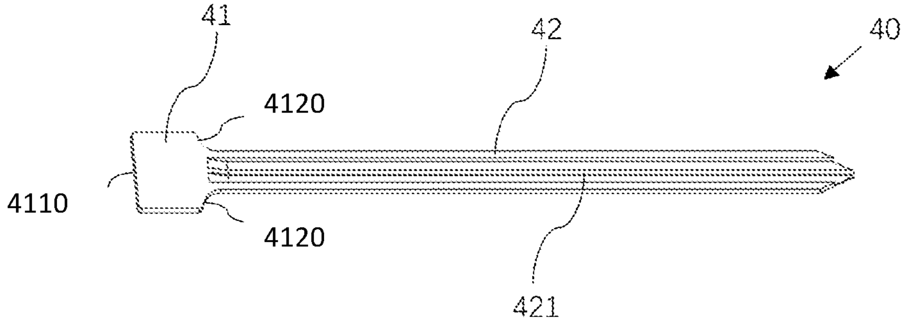
FIG. 7C is a schematic structural view of a striking member according to yet another embodiment of the invention.

FIG. 7C is a perspective view of the striking member according to one embodiment of the present invention.

Figure 20:
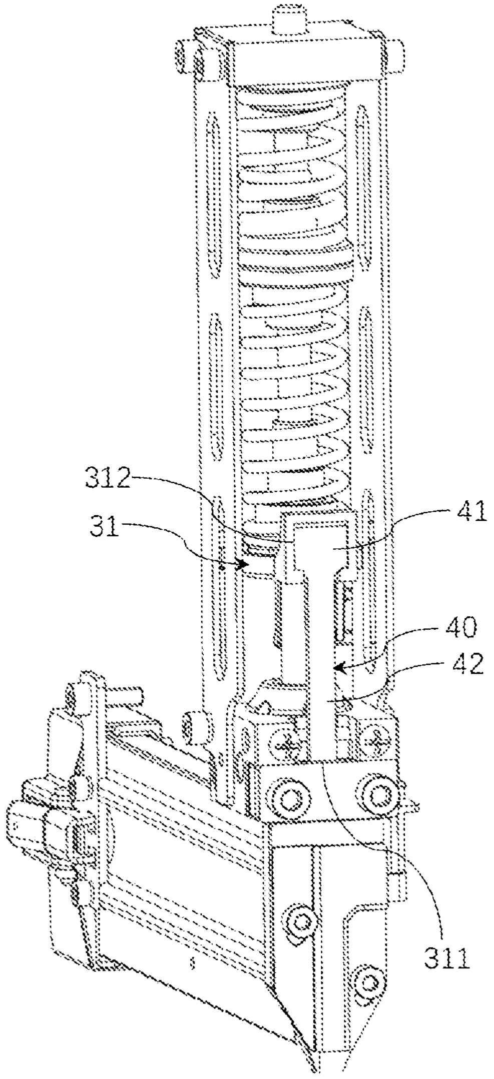
FIG. 20 is a schematic structural view of the striking member installed on the piston part according to one embodiment of the invention.

FIG. 20 is a schematic diagram of the striking member installed on the piston part according to one embodiment of the present invention.

As shown in FIGS. 2C, 6, 8B, and 20, the striking member 40 has a plate-like shape as a whole, including a mounting tail 41 and a guiding striking part 42.

The mounting tail 41 is used to install the striking member 40 onto the striking member driving assembly 30. The mounting tail 41 is shaped like a square plate, and the side of the mounting tail 41 that is away from the guiding striking part 42 is perpendicular to the aforementioned reciprocating motion direction. This side is the first force-receiving surface 4110, which is also the side of the tail of the striking member 40.

The guiding striking part 42 is used for striking the nail. The guiding striking part 42 is integrally formed with the mounting tail 41, and is shaped like a long strip plate. Its width is smaller than that of the mounting tail 41, and it connects to the middle part of one side of the mounting tail 41. The connection position between the mounting tail 41 and the guiding striking part 42 is curved. The two side faces on both sides of the connection between the mounting tail 41 and the guiding striking part 42 are a pair of second force-receiving surfaces 4120, and the first and second force-receiving surfaces 4110 and 4120 are opposite to each other.

The guiding striking part 42 has a guiding recess 421 on one surface, which is used to regulate the direction of motion of the striking member 40 during the nailing process. The aforementioned striking member guiding groove 3312 also has a groove-like structure matching the guiding recess 421. Therefore, the guiding striking part 42 can be inserted into the striking member guiding groove 3312 from the guiding groove opening 3311 of the guiding groove and can be slidably fitted with the striking member guiding groove 3312.

When the striking member 40 is installed on the piston 31, the mounting tail 41 is embedded in the square groove portion 3121, and the end of the guiding striking part 42 near the mounting tail 41 is embedded in the strip groove portion 3122, so that the mounting tail 41 is limited in all four planar directions. When striking a nail, i.e., when the piston 31 moves in the direction D1, the side wall of the striking member receiving slot 312' directly exerts force on the first force-receiving surface 4110 of the tail of the striking member 40, that is, directly exerts force on one end of the striking member 40 in the length direction, and since it is restricted in all four directions, after exerting force on the striking member 40, the striking member 40 will not produce relative displacement with the piston 31 due to the force or inertia. When the spring 32 stores energy, i.e., when the piston 31 moves in the direction D2, the pair of limit steps 3123 exerts force on the pair of second force-receiving surfaces 4120 of the striking member 40, thereby pulling the striking member 40 to move in the direction D2.

Therefore, after the striking member baffle 22 is removed, the replacement opening 213 is exposed, and the striking member tail 41 of the striking member 40 and the corresponding striking member fastener are exposed from the replacement opening 213, making it easy to disassemble the striking member 40 that needs to be replaced. After the striking member 40 to be replaced has been disassembled, the guiding groove opening 3311 is exposed from the replacement opening 213, and it is now easy to install a new striking member 40 by inserting it into the striking member guiding groove 3312 through the guiding groove opening 3311.

FIG. 9C is a flowchart of the striking member replacement process according to one embodiment of the invention.

As shown in FIG. 9C, based on the nail gun 10 and the striking member installation mechanism 12 according to one embodiment of the invention, the process of replacing the striking member 40 in the nail gun 10 includes the following steps.

Step S3-1: Use a screwdriver to remove the two fasteners 226 of the striking member baffle 22, then proceed to step S3-2.

Step S3-2: Hold the non-slip protrusion 2221 on the striking member baffle 22 and push it in the direction indicated by the indicating protrusion 2222, so that the baffle latch 223 is released from the baffle latch slot 2113, then proceed to step S3-3.

Step S3-3: Move the striking member baffle 22 away, exposing the replacement opening 213, then proceed to step S3-4.

Step S3-4: Lift the mounting tail 41 of the striking member 40 to be replaced so that the mounting tail 41 is disengaged from the striking member receiving slot 312' of the piston part 31, then proceed to step S3-5.

Step S3-5: Remove the striking member 40 to be replaced from the striking member guiding groove 3312, then proceed to step S3-6.

Step S3-6: Insert the new striking member 40 into the striking member guiding groove 3312 through the guiding groove opening 3311, adjust the insertion depth of the striking member 40 so that the mounting tail 41 aligns with the striking member receiving slot 312' of the piston part 31 and embeds into it, then proceed to step S3-7.

Step S3-7: Align the striking member baffle 22 with the replacement opening 213, and align the baffle latch 223 with the baffle positioning notch 2131, cover the replacement opening 213 with the striking member baffle 22, then proceed to step S3-8.

Step S3-8: Hold the non-slip protrusion 2211 on the striking member baffle 22 and push it in the opposite direction indicated by the indicating protrusion 2212, so that the baffle latch 223 latches into the baffle latch slot 2113, then proceed to step S3-9.

Step S3-9: Insert the two fasteners 226 into the two installation holes 224 of the striking member baffle 22 and tighten them with a screwdriver, then proceed to the end state.

As described above, the striking member installation mechanism 12 and the nail gun 10 of this embodiment can quickly and easily replace the striking member 40 by disassembling the striking member baffle 22 and accessing the replacement opening 213, and can equally easily reinstall the striking member baffle 22, allowing the nail gun 10 to quickly return to a working state.

Effect and Function of Embodiment 3

In this embodiment, the striking member baffle can be removed, and the striking member can be replaced through the replacement opening without disassembling the entire casing or removing and installing a large number of internal components. Moreover, since the piston has a square groove portion that matches the mounting tail of the striking member, the striking member's mounting tail can be embedded and fixed in the square groove portion without the need for pins, screws, or other connectors. This reduces the number of parts and avoids the loss of these smaller parts. Additionally, through the striking member receiving slot, force can be directly applied to the mounting tail during nailing, and compared with the case where the force is transmitted through connectors, the connection structure of the present invention can improve the strength and stability of nailing, or reduce the strength requirements for the striking member under the same nailing force.

Specifically, the striking member mounting tail (i.e., the mounting tail) is shaped like a square plate with a width greater than the guiding striking part. The striking member receiving slot on the piston has a square groove portion and a strip groove portion. One end of the strip groove portion communicates with the square groove portion, and the other end communicates with the outside. Therefore, when installed in the striking member receiving slot, the mounting tail of the striking member is embedded and fixed in the square groove portion, and one end of the guiding striking part is embedded in the strip groove portion. This way, the striking member is limited in all four planar directions, and during the nailing process, not only can force be directly applied to the mounting tail, but after applying force, the striking member will not have relative displacement with the piston due to inertia, thereby improving the stability of nailing.

In the above embodiments, the width of the striking member mounting tail 41 is greater than the width of the guiding striking part 42 of the striking member, and the shape of the striking member receiving slot 312' on the piston 31 matches it so that the striking member tail 41 is limited in all four directions on the plane. In alternative options, the width of the guiding striking part 42 can also be equal to or greater than the width of the striking member tail 41. A groove structure can be set at the connection position between the striking member tail 41 and the guiding striking part 42, and the shape of the striking member receiving slot 312' matches it, which can achieve the corresponding technical effect.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. A nail gun, comprising:

a casing having a main casing body and a striking member baffle removably disposed over a replacement opening of the main casing body;

a striking member removably disposed inside the main casing body and below the striking member baffle; and a striking member driving assembly having a piston for driving the striking member in a reciprocating motion direction, wherein the piston comprises a striking member connector having an upper surface facing the striking member baffle; wherein a connecting post extends from the upper surface towards the striking member baffle;

wherein the striking member comprises a striking member tail and a guiding striking part;

wherein the striking member tail is plate-shaped and comprises a mounting hole configured to receive the connecting post;

wherein the striking member tail is configured to be in contact with the upper surface of the striking member connector when the connecting post is received in the mounting hole; and wherein the striking member baffle has a baffle inner side facing the striking member and a baffle latch located on the baffle inner side, and the main casing body has a baffle latch slot for receiving the baffle latch, wherein the striking member baffle and the main casing body are latched together by engaging the baffle latch with the baffle latch slot, so that the striking member baffle is removably disposed over the replacement opening of the main casing body.

2. The nail gun of claim 1, wherein an extension direction of the connecting post is perpendicular to the upper surface and perpendicular to the reciprocating motion direction, and an extension length of the connecting post is at least equal to a depth of the mounting hole.

3. The nail gun of claim 2, wherein the connecting post is cylindrical, and the mounting hole comprises a circular hole matching the connecting post.

4. The nail gun of claim 1, wherein the piston comprises a striking member positioning rim extending from a first side of the striking member connector, wherein the striking member tail is in contact with the striking member positioning rim.

5. The nail gun of claim 4, wherein the striking member positioning rim comprises a first extending rim section extending from the first side of the striking member connector towards the striking member baffle, and a second extending rim section extending from an end of the first extending rim section, wherein an extension direction of the first extending rim section is perpendicular to the reciprocating motion direction, and an extension direction of the second extending rim section is parallel to the reciprocating motion direction.

6. The nail gun of claim 5, wherein a first distance between the second extending rim section and the striking member connector is greater than a thickness of the striking member, and a second distance between the first extending rim section and the connecting post is greater than a third distance from one end of the striking member to the mounting hole.

7. The nail gun of claim 1, wherein the baffle latch includes a first baffle latch extension extending vertically downward from the baffle inner side of the striking member baffle and a second baffle latch extension extending along a length direction of the striking member baffle from an end of the first baffle latch extension, wherein the second baffle latch extension extends into the baffle latch slot to make the baffle latch engage with the baffle latch slot.

* * * * *